(12) United States Patent  (10) Patent No.: US 7,332,257 B2
Miyako et al.  (45) Date of Patent: Feb. 19, 2008

(54) COMPOSITION FOR OPTICAL FILM, AND OPTICAL FILM

(75) Inventors: Takeomi Miyako, Chiba (JP); Ken Moriwaki, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 157 days.

(21) Appl. No.: 10/869,946

(22) Filed: Jun. 18, 2004

(65) Prior Publication Data
US 2005/0008969 A1  Jan. 13, 2005

(30) Foreign Application Priority Data
Jul. 11, 2003 (JP) ............... 2003-273677
Jul. 16, 2003 (JP) ............... 2003-275442

(51) Int. Cl.
*G03F 7/00* (2006.01)
*G03F 7/004* (2006.01)
(52) U.S. Cl. .............. 430/270.1; 430/270.15; 430/270.18; 430/270.19; 430/944; 430/945
(58) Field of Classification Search ............ 430/270.1, 430/944, 945, 270.19, 270.15, 270.18
See application file for complete search history.

(56) References Cited
U.S. PATENT DOCUMENTS

| | | | |
|---|---|---|---|
| 4,656,121 | A | 4/1987 | Sato et al. |
| 5,804,102 | A | 9/1998 | Oi et al. |
| 6,071,672 | A * | 6/2000 | Namba et al. ......... 430/270.18 |
| 6,255,031 | B1 | 7/2001 | Yao et al. |
| 6,749,984 | B2 * | 6/2004 | Kawauchi ............. 430/270.1 |
| 6,775,059 | B2 | 8/2004 | Kuwabara |
| 2001/0039895 | A1 * | 11/2001 | Kawauchi ............ 101/453 |
| 2003/0170566 | A1 * | 9/2003 | Yamasaki et al. ....... 430/272.1 |
| 2003/0203304 | A1 * | 10/2003 | Katagiri et al. .......... 430/124 |
| 2006/0073407 | A1 | 4/2006 | Yamanobe et al. |

FOREIGN PATENT DOCUMENTS

| | | |
|---|---|---|
| EP | 905202 A1 * | 3/1999 |
| JP | 05024360 A * | 2/1993 |
| JP | 05-024360 | 9/1993 |

(Continued)

OTHER PUBLICATIONS

English language abstract of JP 05-024360.*

(Continued)

Primary Examiner—Amanda C. Walke
(74) Attorney, Agent, or Firm—Oblon, Spivak, McClelland, Maier & Neustadt, P.C.

(57) ABSTRACT

A composition for an optical film comprising a stabilized cyanine dye and a quencher compound, wherein the stabilized cyanine dye comprises a cation and a quencher anion, and the cation is selected from the group consisting of compounds of the following formulae (I) to (III):

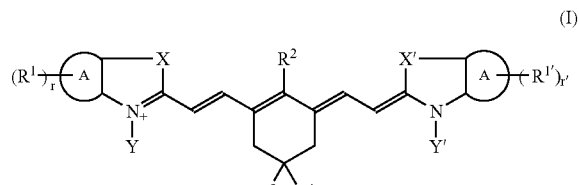

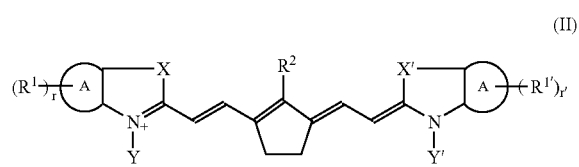

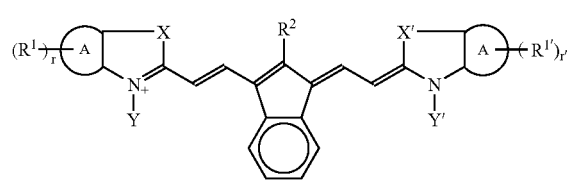

wherein each of rings A and A' which are independent of each other, is a benzene ring, a naphthalene ring or a pyridine ring, each of $R^1$ and $R^{1'}$ which are independent of each other, is a halogen atom, a nitro group, a cyano group, a $C_{6-30}$ aryl group, a $C_{1-8}$ alkyl group or a $C_{1-8}$ alkoxy group, each of $R^2$, $R^3$ and $R^4$ which are independent of one another, is a hydrogen atom, a halogen atom, a cyano group, a $C_{6-30}$ aryl group, a diphenylamino group or a $C_{1-8}$ alkyl group, each of X and X' which are independent of each other, is an oxygen atom, a sulfur atom, a selenium atom, a propan-2,2-diyl group, a butane-2,2-diyl group, a $C_{3-6}$ cycloalkane-1,1-diyl group, —NH— or —NY$_1$—, each of Y, Y' and $Y_1$ which are independent of one another, is a $C_{1-30}$ organic group, and each of r and r' which are independent of each other, is an integer of from 0 to 2.

12 Claims, No Drawings

FOREIGN PATENT DOCUMENTS

| | | |
|---|---|---|
| JP | A-2002-200711 | 7/2002 |
| JP | 2002-350632 | 12/2002 |
| JP | A-2002-350632 | 12/2002 |
| JP | 2003-21715 | 1/2003 |
| JP | 2003-43244 | 2/2003 |
| JP | 2003-75628 | 3/2003 |
| JP | 2003-96040 | 4/2003 |
| WO | WO2004/048480 A1 | 6/2004 |

OTHER PUBLICATIONS

English language machine translation of JP 05-024360.*
English language machine translation of JP 2002-350632.*
U.S. Appl. No. 10/176,683, filed Jun. 24, 2002, Suzuki et al.
U.S. Appl. No. 10/869,946, filed Jun. 18, 2004, Miyako et al.
U.S. Appl. No. 10/914,130, filed Aug. 10, 2004, Miyako et al.
Japanese Office Action (Received May 8, 2007) with English Language Translation.

* cited by examiner

COMPOSITION FOR OPTICAL FILM, AND OPTICAL FILM

The present invention relates to a composition which is useful for an optical film having a near infrared absorptivity, which absorbs near infrared rays, and an optical film employing such a composition. Particularly, it relates to an optical film which is useful for an optical filter which is used as installed on the viewing side of a plasma display panel (hereinafter referred to simply as PDP).

The principle of PDP is such that a voltage is applied to a rare gas (such as helium, neon, argon or xenon) sealed in between a pair of sheet glass, and ultraviolet rays thereby generated, are impinged to a phosphor to have visible light rays generated.

From PDP, together with the visible light rays, harmful lights such as near infrared rays or electromagnetic waves will be radiated. For example, near infrared rays are likely to bring about malfunction of near infrared remote control devices for home electric appliances such as household TV, air conditioners or video cassette recorders, or bring about malfunction of communication equipments to adversely affect data transmission of e.g. POS (point-of-sale) system. Therefore, on the front side (viewing side) of PDP, it is necessary to provide an optical filter to prevent harmful lights such as near infrared rays.

Heretofore, as an optical filter, it has been proposed to employ an optical film to shield near infrared rays having a wavelength of from 850 to 1,100 nm.

Such an optical film may, for example, be one wherein a near infrared ray absorptive dye is dispersed in a transparent resin, which is then formed on a film of e.g. polyethylene terephthalate (PET).

As such a near infrared absorptive dye, various dyes of polymethine type, metal complex type, squalium type, cyanine type, indoaniline type, diimonium type, etc. have been reported. These dyes are employed usually in a combination of two or more types, in order to impart a high degree of infrared absorptivity. For example, JP-A-2003-21715 proposes a near infrared absorbing film having a near infrared absorbing layer containing a cyanine dye and a diimonium dye.

However, these dyes have a problem such that they are poor in light resistance and likely to deteriorate. Especially when two or more dyes are used in combination, a remarkable deterioration may sometimes be observed with one of the dyes, and for example, when the cyanine dye and the diimonium dye are used in combination as in the near infrared absorbing film in the above-mentioned patent document, deterioration of the diimonium dye is particularly large. Such deterioration of the dye brings about a color change of the film, which deteriorates the optical characteristics of the film.

In order to improve the light resistance of a dye, e.g. JP-A-2002-350632 discloses an optical filter containing a cyanine dye stabilized by letting a cyanine cation form a salt with a quencher anion.

Further, JP-A-2003-43244 discloses a near infrared absorbing film having a layer containing a diimonium dye and a quencher compound, and a layer containing a cyanine dye and a quencher compound.

However, e.g. the stabilized cyanine dye disclosed in JP-A-2002-350632 is deficient in light resistance for practical use, although it is stable as compared with a usual cyanine dye.

Further, the near infrared absorbing film disclosed in JP-A-2003-43244 requires many steps to incorporate a plurality of dyes in separate layers respectively and thus is poor in productivity, such being undesirable.

On the other hand, the diimonium dye is one of typical dyes capable of absorbing near infrared rays, and it is widely used for e.g. near infrared filters, heat insulating films or sunglasses.

However, the diimonium dye is weak against light, heat, humidity, etc. and thus has a problem that it is likely to be deteriorated. Such deterioration of the dye is not only lower the near infrared absorptivity but also causes a color change, whereby the visual transmittance decreases, and the visual color tends to be greenish, thus leading to deterioration of the optical characteristics of the optical film. Whereas, e.g. JP-A-2003-96040 discloses a near infrared absorbing filter containing a diimonium dye having a specific structure. Further, JP-A-2003-75628 discloses an optical filter having a diimonium dye and an anthraquinone dye incorporated to a transparent resin.

However, e.g. the diimonium dye disclosed in JP-A-2003-96040 is poor in moisture resistance, although the heat resistance is good. Further, the diimonium dye disclosed in JP-A-2003-75628 has moisture resistance to some extent, but such moisture resistance may sometimes be not sufficient. Therefore, the optical film may undergo a color change, and its optical characteristics may deteriorate.

The present invention has been made in view of the above-mentioned problems of the prior art, and it is an object of the present invention to provide a composition for an optical film which has a high level of near infrared absorptivity and which is excellent in light resistance, and an optical film which has a simple structure and is easy to produce. Further, it is an object of the present invention to provide an optical film excellent in moisture resistance and optical characteristics.

In the first aspect, the present invention provides an optical film composition comprising a stabilized cyanine dye and a quencher compound, wherein the stabilized cyanine dye comprises a cation and a quencher anion, and the cation is selected from the group consisting of compounds of the following formulae (I) to (III):

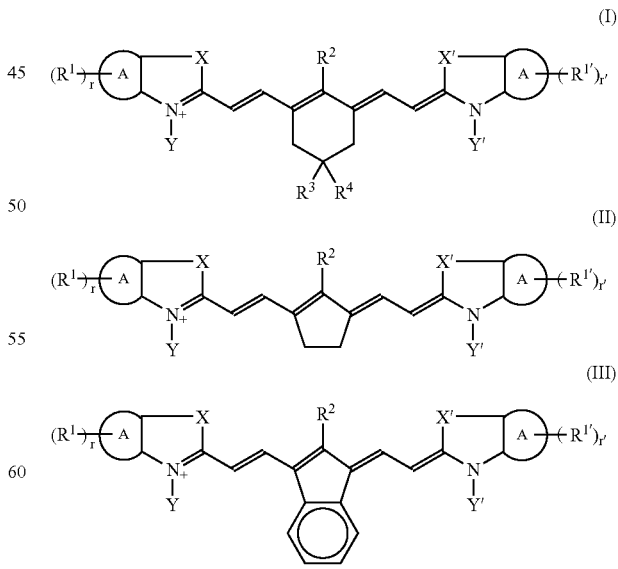

wherein each of rings A and A' which are independent of each other, is a benzene ring, a naphthalene ring or a pyridine ring, each of $R^1$ and $R^{1'}$ which are independent of each other, is a halogen atom, a nitro group, a cyano group, a $C_{6-30}$ aryl group, a $C_{1-8}$ alkyl group or a $C_{1-8}$ alkoxy group, each of $R^2$, $R^3$ and $R^4$ which are independent of one another, is a hydrogen atom, a halogen atom, a cyano group, a $C_{6-30}$ aryl group, a diphenylamino group or a $C_{1-8}$ alkyl group, each of X and X' which are independent of each other, is an oxygen atom, a sulfur atom, a selenium atom, a propan-2,2-diyl group, a butan-2,2-diyl group, a $C_{3-6}$ cycloalkan-1,1-diyl group, —NH— or —$NY_1$—, each of Y, Y' and $Y_1$ which are independent of one another, is a $C_{1-30}$ organic group, and each of r and r' which are independent of each other, is an integer of from 0 to 2.

In the second aspect, the present invention provides an optical film having a near infrared absorbing layer wherein the above-mentioned composition for an optical film is dispersed in a transparent resin.

In the third aspect, the present invention provides an optical film having a near infrared absorbing layer which comprises a transparent resin and a diimonium dye of the following formula (V) contained in the transparent resin:

$$\left[ \begin{array}{c} R^{18}-N(R^{17})-\text{Ar}-N^+=\text{Ar}=N^+-\text{Ar}-N(R^{23})-R^{24} \\ R^{19}-N(R^{20})-\text{Ar} \quad \text{Ar}-N(R^{21})-R^{22} \end{array} \right] 2X^- \tag{V}$$

wherein each of $R^{17}$ to $R^{24}$ which are independent from one another, is a hydrogen atom, an alkyl group which may be substituted, an alkenyl group which may be substituted, an aryl group which may be substituted, or an alkynyl group which may be substituted, $X^-$ is an anion represented by $(R_fSO_2)_2N^-$ or $(R_fSO_2)_3C^-$, and $R_f$ is a $C_{1-4}$ fluoroalkyl group.

By the composition for an optical film of the present invention, an optical film will be provided which has a high level of near infrared absorptivity and is excellent in light resistance and which has a simple structure and is easy to produce. Further, by the optical film containing the diimonium dye having a specific anion, an optical film excellent in moisture resistance and optical characteristics, can be provided.

Now, the present invention will be described in detail with reference to the preferred embodiments.

Composition for an Optical Film

The composition for an optical film according to the first aspect of the present invention, is characterized by comprising the stabilized cyanine dye and the quencher compound and has near infrared absorptivity.

Stabilized Cyanine Dye

In the first aspect of the present invention, the stabilized cyanine dye is a salt compound comprising a cation (hereinafter sometimes referred to as a cyanine cation) selected from the group consisting of compounds of the above formulae (I) to (III), and a quencher anion.

Cyanine Cation

In the above formulae (I) to (III), in $R^1$ and $R^{1'}$, the halogen atom may be fluorine, chlorine, bromine or iodine;

the $C_{6-30}$ aryl group may be a phenyl group, a naphthyl group, a 2-methylphenyl group, a 3-methylphenyl group, a 4-methylphenyl group, a 4-vinylphenyl group, a 3-isopropylphenyl group, a 4-isopropylphenyl group, a 4-butylphenyl group, a 4-isobutylphenyl group, a 4-tertiary butylphenyl group, a 4-hexylphenyl group, a 4-cyclohexylphenyl group, a 4-octylphenyl group, a 4-(2-ethylhexyl)phenyl group, a 4-stearylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 2,4-ditertiary butylphenyl group, a 2,5-ditertiary butylphenyl group, a 2,6-ditertiary butylphenyl group, a 2,4-ditertiary pentylphenyl group, a 2,5-ditertiary amylphenyl group, a 2,5-ditertiary octylphenyl group, a 2,4-dicumylphenyl group, a cyclohexylphenyl group, a biphenyl group or a 2,4,5-trimethylphenyl group; the $C_{1-8}$ alkyl group may be a methyl group, an ethyl group, a propyl group, an isopropyl group, a butyl group, a secondary butyl group, a tertiary butyl group, an isobutyl group, a pentyl group, an isopentyl group, a tertiary pentyl group, a hexyl group, a cyclohexyl group, a cyclohexylmethyl group, a 2-cyclohexylethyl group, a heptyl group, an isoheptyl group, a tertiary heptyl group, a n-octyl group, an isooctyl group, a tertiary octyl group or a 2-ethylhexyl group; and the $C_{1-8}$ alkoxy group may be a methyloxy group, an ethyloxy group, an isopropyloxy group, a propyloxy group, a butyloxy group, a pentyloxy group, an isopentyloxy group, a hexyloxy group, a heptyloxy group, an octyloxy group or a 2-ethylhexyloxy group.

In $R^2$, $R^3$ and $R^4$, the halogen atom, the $C_{6-30}$ aryl group and the $C_{1-8}$ alkyl group may be those exemplified above for $R^1$.

In X and X', the $C_{3-6}$ cycloalkan-1,1-diyl group may be a cyclopropan-1,1-diyl group, a cyclobutan-1,1-diyl group, a 2,4-dimethylcyclobutan-1,1-diyl group, a 3-dimethylcyclobutan-1,1-diyl group, a cyclopentan-1,1-diyl group or a cyclohexan-1,1-diyl group.

The $C_{1-30}$ organic group represented by Y, Y' and $Y_1$, may be an alkyl group such as a methyl group, an ethyl group, a propyl group, an isopropyl group, a butyl group, a secondary butyl group, a tertiary butyl group, an isobutyl group, a pentyl group, an isopentyl group, a tertiary pentyl group, a hexyl group, a cyclohexyl group, a cyclohexylmethyl group, a 2-cyclohexylethyl group, a heptyl group, an isoheptyl group, a tertiary heptyl group, a n-octyl group, an isooctyl group, a tertiary octyl group, a 2-ethylhexyl group, a nonyl group, an isononyl group, a decyl group, a dodecyl group, a tridecyl group, a tetradecyl group, a pentadecyl group, a hexadecyl group, a heptadecyl group or an octadecyl group, an alkenyl group such as a vinyl group, a 1-methylethenyl group, a 2-methylethenyl group, a propenyl group, a butenyl group, an isobutenyl group, a pentenyl group, a hexenyl group, a heptenyl group, an octenyl group, a decenyl group, a pentadecenyl group or a 1-phenylpropen-3-yl group, an alkylaryl group such as a phenyl group, a naphthyl group, a 2-methylphenyl group, a 3-methylphenyl group, a 4-methylphenyl group, a 4-vinylphenyl group, a 3-isopropylphenyl group, a 4-isopropylphenyl group, a 4-butylphenyl group, a 4-isobutylphenyl group, a 4-tertiary butylphenyl group, a 4-hexylphenyl group, a 4-cyclohexylphenyl group, a 4-octylphenyl group, a 4-(2-ethylhexyl)phenyl group, a 4-stearylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 2,4-ditertiary butylphenyl group or a cyclohexylphenyl group, an arylalkyl group such as a benzyl group, a phenethyl group, a 2-phenylpropan-2-yl group, a diphenylmethyl group, a triphenylmethyl group, a styryl group or a cinnamyl group, one having such a group interrupted by an ether bond or a thioether bond, such as a 2-methoxyethyl group, a 3-methoxypropyl group, a 4-methoxybutyl group, a 2-butoxyethyl group, a methoxyethoxyethyl group, a methoxyethoxyethoxyethyl group, a 3-methoxybutyl group, a 2-phenoxyethyl group, a 3-phenoxypropyl group, a 2-methylthioethyl group, or a 2-phenylthioethyl group. Further, these groups may be substituted by an alkoxy group, an alkenyl group, a nitro group, a cyano group, a halogen atom or the like.

Among them, one wherein $R^2$ is a halogen atom, is preferred, since the infrared absorbing effect of the optical filter will thereby be good. Further, one wherein each of X and X' is a group selected from a propan-2,2-diyl group, a butan-2,2-diyl group and a $C_{3-6}$ cycloalkan-1,1-diyl group, is preferred since its photostability is high.

More specifically, the following cations Nos. 1 to 50 may specifically be mentioned as such preferred cyanine cations.

Cation No. 1

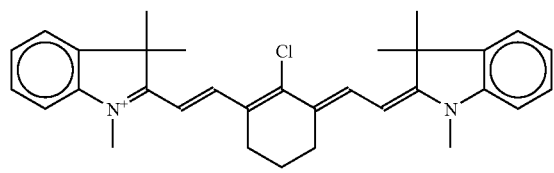

Cation No. 2

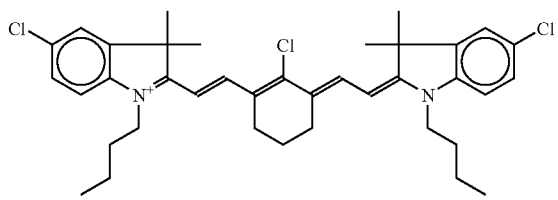

Cation No. 3

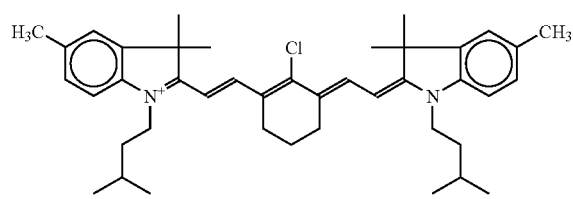

Cation No. 4

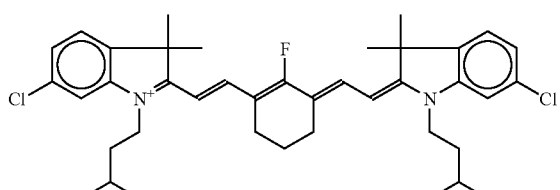

Cation No. 5

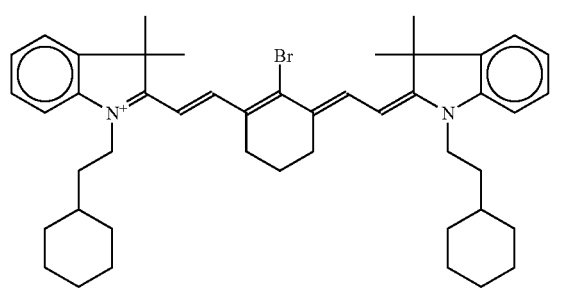

Cation No. 6

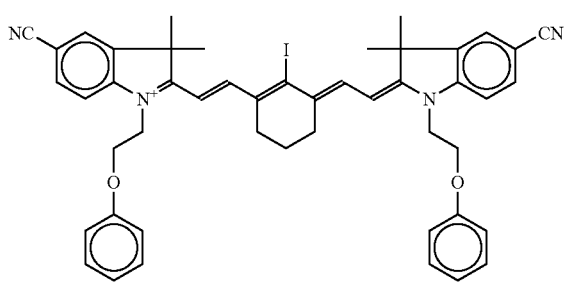

Cation No. 7

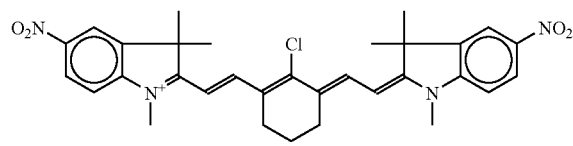

Cation No. 8

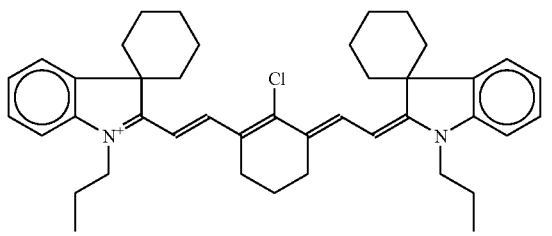

Cation No. 9

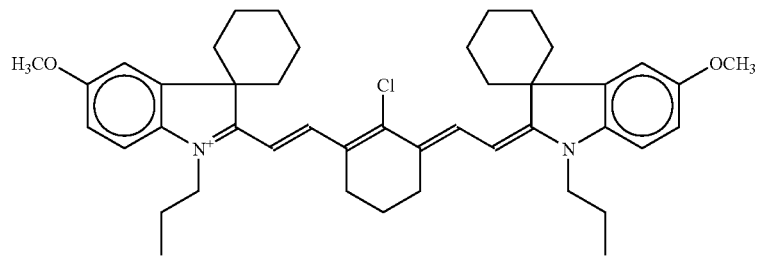

-continued
Cation No. 10
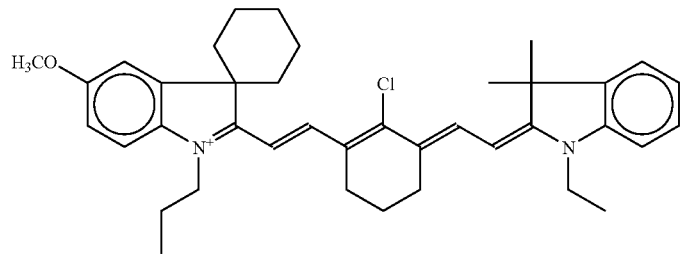
Cation No. 11
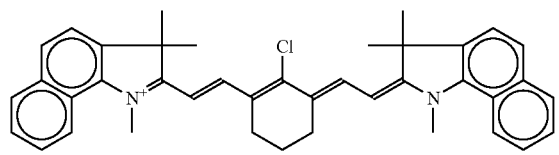
Cation No. 12
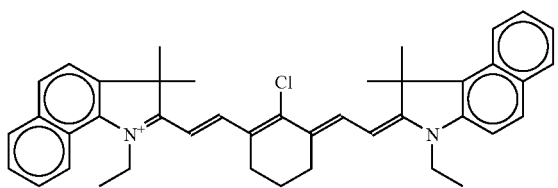
Cation No. 13
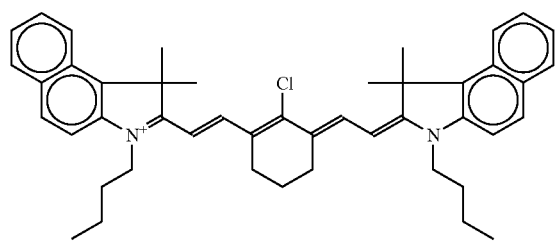
Cation No. 14
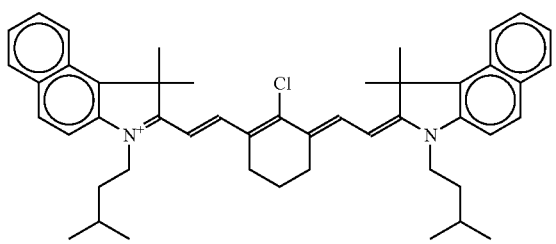
Cation No. 15
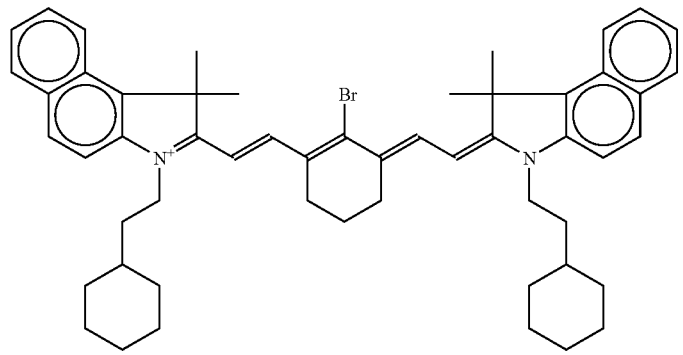
Cation No. 16
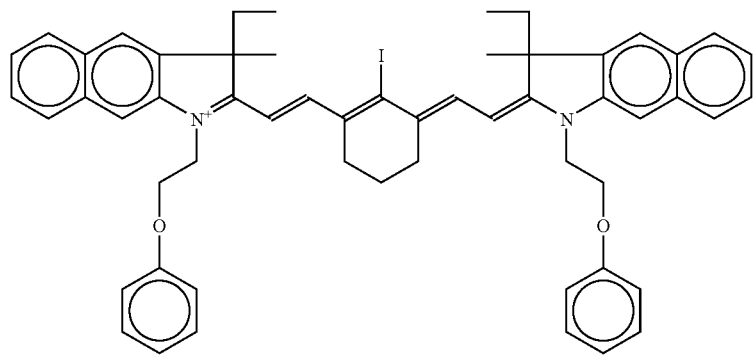

-continued
Cation No. 17
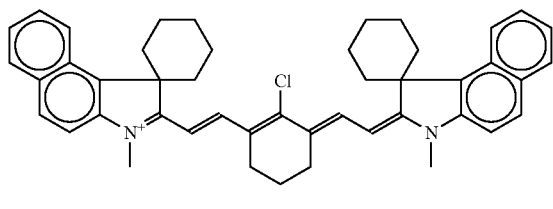
Cation No. 18
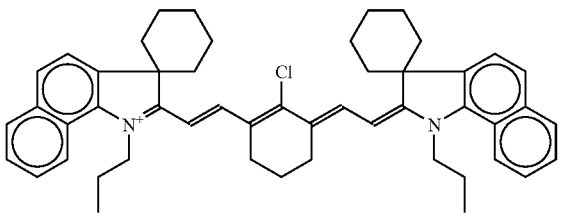
Cation No. 19
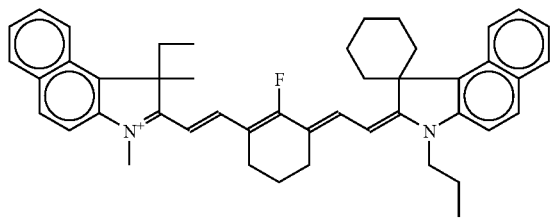
Cation No. 20
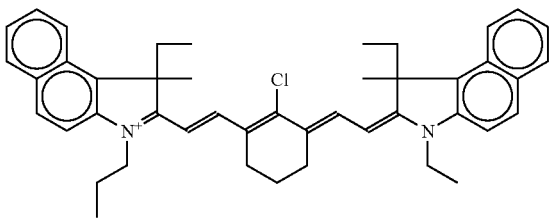
Cation No. 21
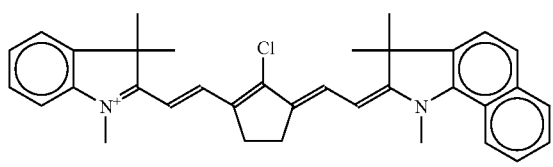
Cation No. 22
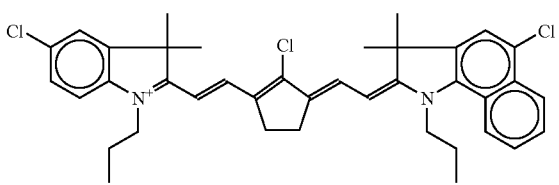
Cation No. 23
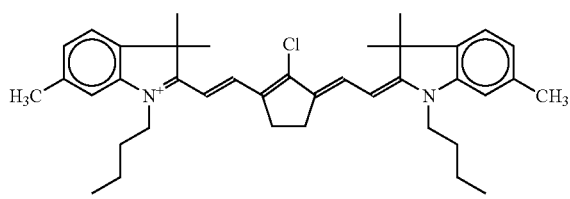
Cation No. 24
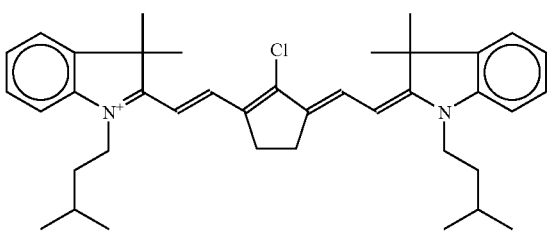
Cation No. 25
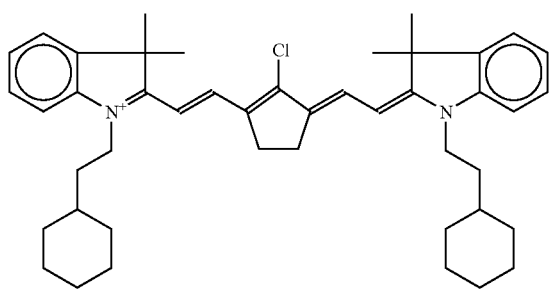
Cation No. 26
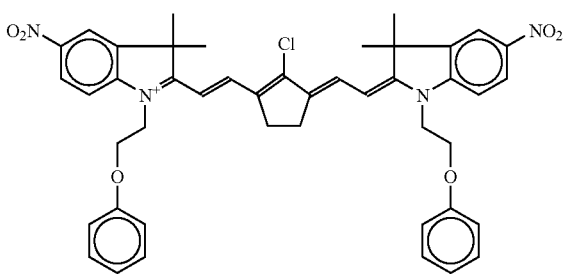
Cation No. 27
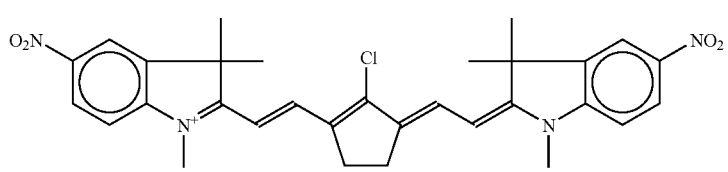

-continued
Cation No. 28
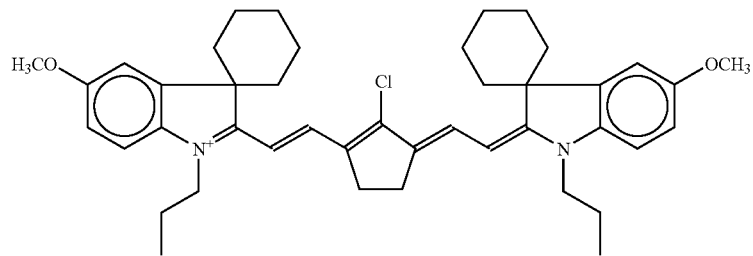
Cation No. 29
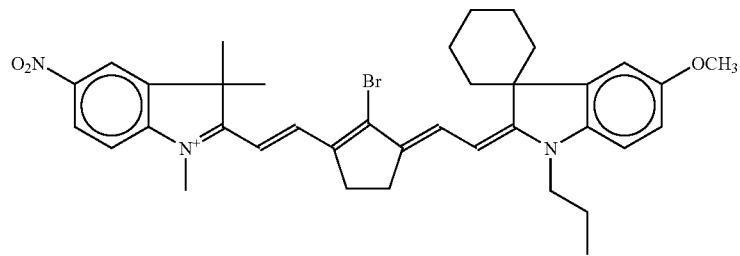
Cation No. 30
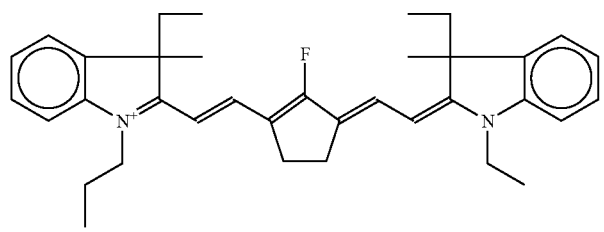
Cation No. 31
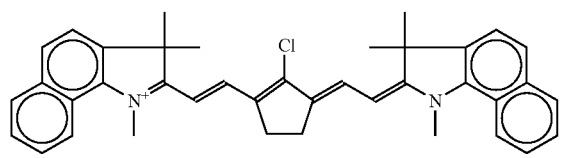
Cation No. 32
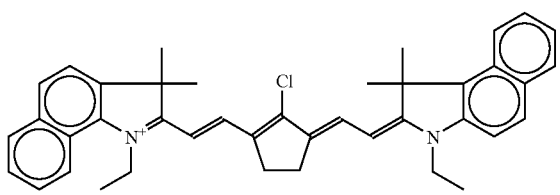
Cation No. 33
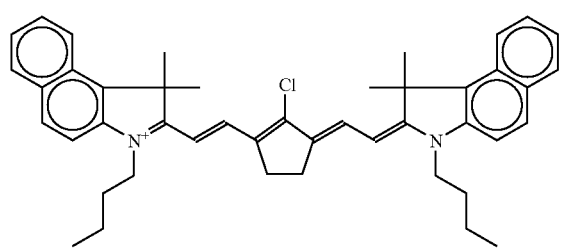
Cation No. 34
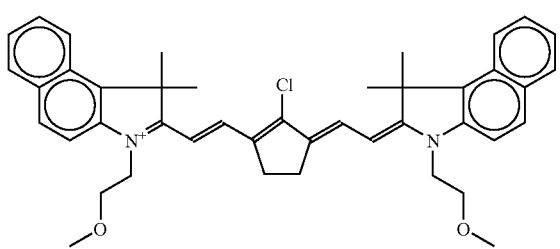
Cation No. 35
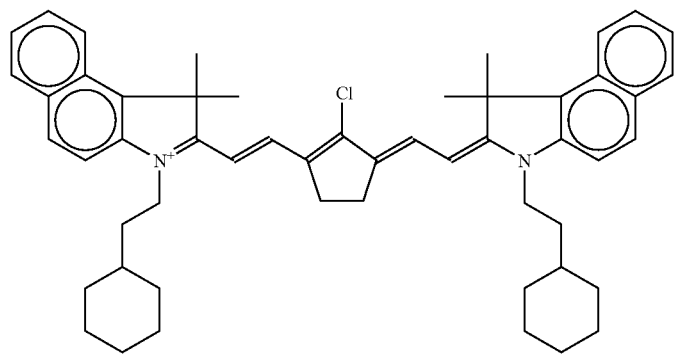

-continued
Cation No. 36
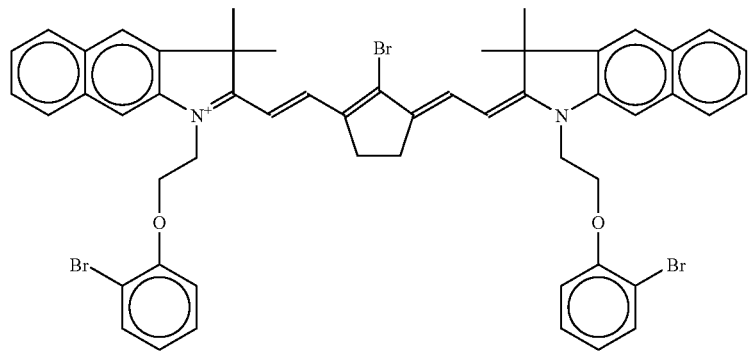
Cation No. 37    Cation No. 38
Cation No. 39    Cation No. 40
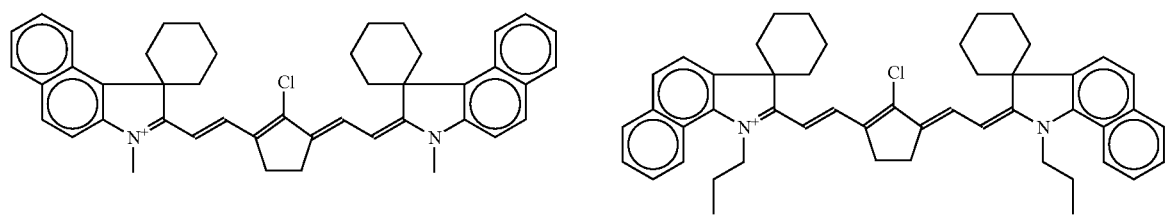
Cation No. 41    Cation No. 42
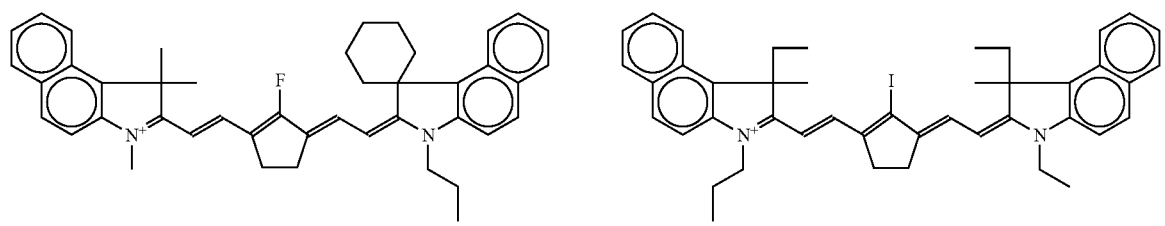
Cation No. 43    Cation No. 44
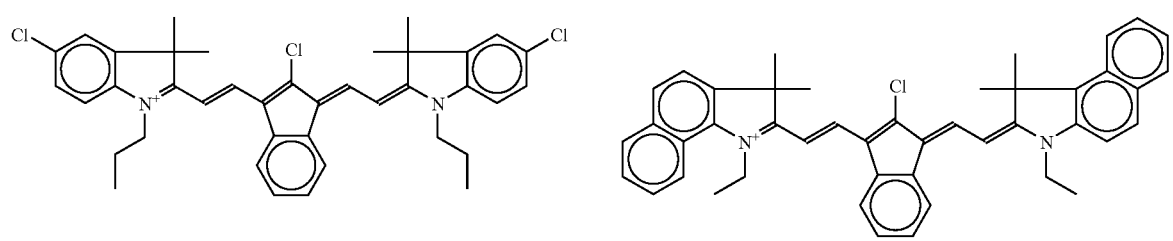
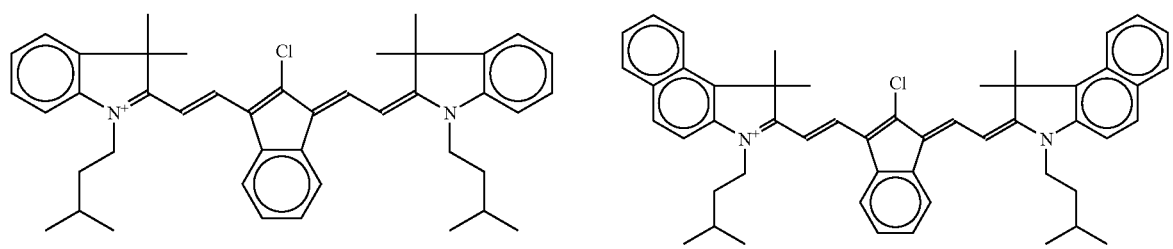

-continued
Cation No. 45
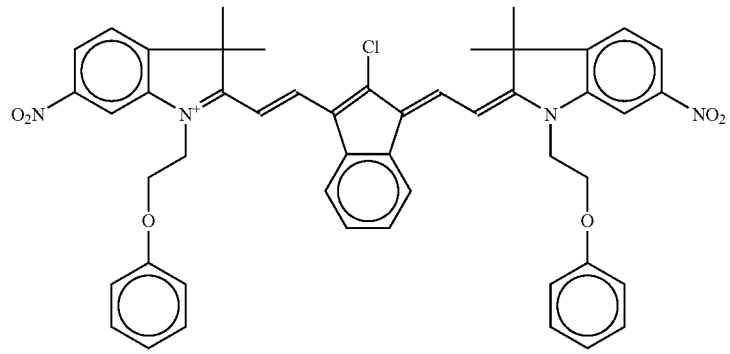
Cation No. 46
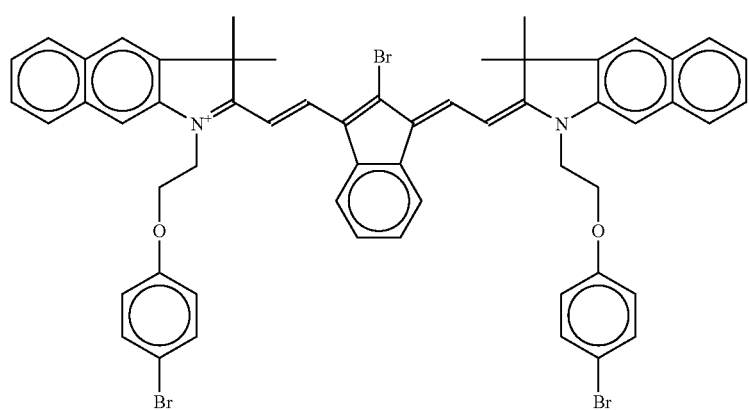
Cation No. 47
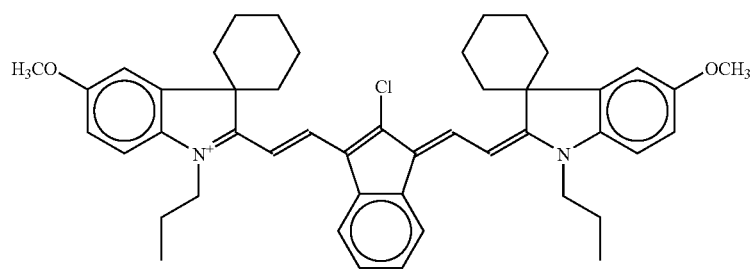
Cation No. 48
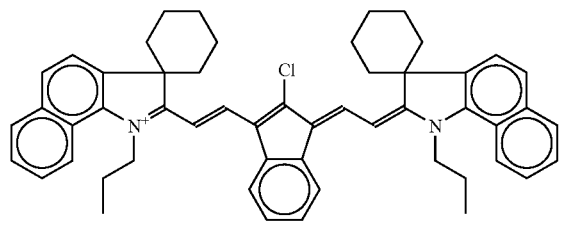
Cation No. 49
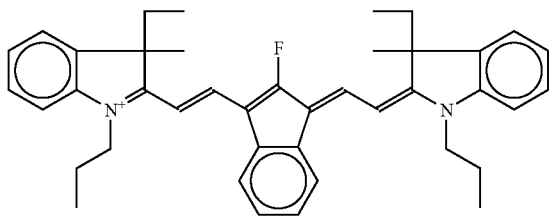
Cation No. 50
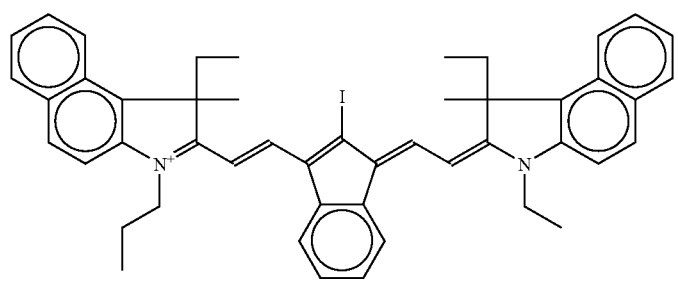

Quencher Anion

In the present invention, the quencher anion means an anion having a function to de-excite (quench) an active molecule in an excited state (such as singlet oxygen ($^1O_2$)) Such a quencher anion is disclosed as applicable to an optical recording material, for example, in JP-A-60-234892, JP-A-5-43814, JP-A-6-239028, JP-A-9-309886, JP-A-10-45767, etc.

As such a quencher anion, a benzenethiol metal complex anion is preferred, since it presents particularly excellent light resistance to an optical filter. As such a benzenethiol metal complex anion, an anion represented by the following formula (A) may, for example, be mentioned.

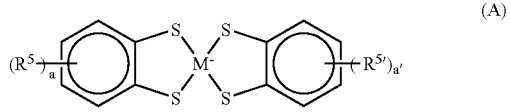

wherein M is a nickel atom or a copper atom, each of $R^5$ and $R^{5'}$ is a hydrogen atom, a halogen atom, a $C_{1-8}$ alkyl group, a $C_{6-30}$ aryl group, or a —$SO_2$-Q group, wherein Q is a $C_{1-8}$ alkyl group, a $C_{6-30}$ aryl group which may be substituted by a halogen atom, a dialkylamino group, a diarylamino group, a piperidino group or a morpholino group, and each of a and a' is an integer of from 1 to 4.

In the above formula (A), as the halogen atom, the $C_{1-8}$ alkyl group and the $C_{6-30}$ aryl group represented by each of $R^5$ and $R^{5'}$, those exemplified above for $R^1$ may be mentioned.

As the $C_{1-8}$ alkyl group represented by Q, those exemplified above for $R^1$ may be mentioned, and as the $C_{6-30}$ aryl group which may be substituted by a halogen atom, those exemplified above for $R^1$ or ones having a benzene ring thereof substituted by from 1 to 4 halogen atoms, may be mentioned. As the alkyl group or the aryl group contained in the dialkylamino group or the diarylamino group, the $C_{1-8}$ alkyl group or a $C_{6-30}$ aryl group exemplified above for $R^1$ may be mentioned. As specific examples of the quencher anion represented by the above formula (A), the following anions Nos. 1 to 11 may be mentioned when M is a nickel atom, and the following anions Nos. 12 to 22 may be mentioned when M is a copper atom.

Anion No. 1

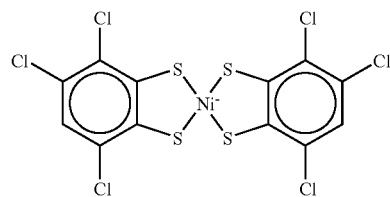

Anion No. 2

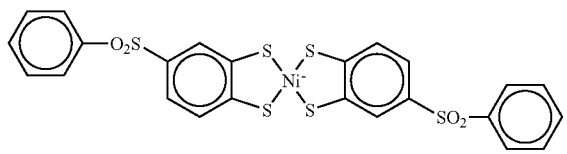

Anion No. 3

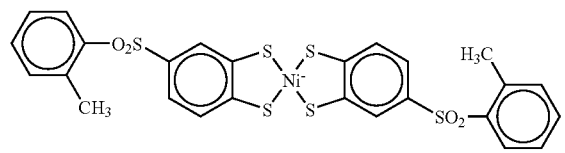

Anion No. 4

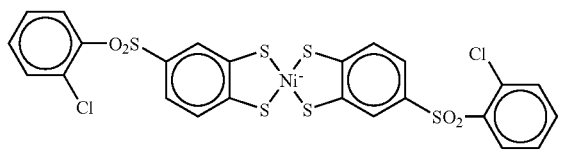

Anion No. 5

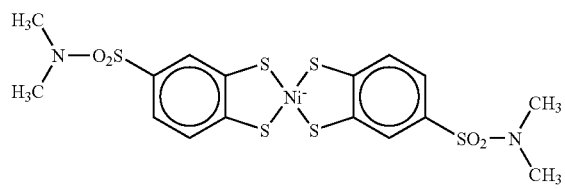

Anion No. 6

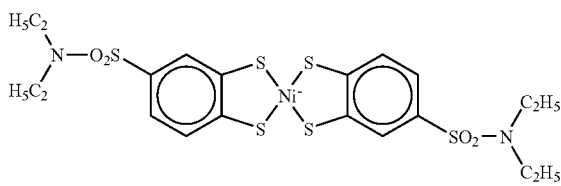

Anion No. 7

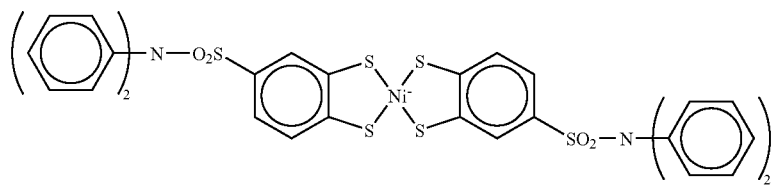

-continued
Anion No. 8
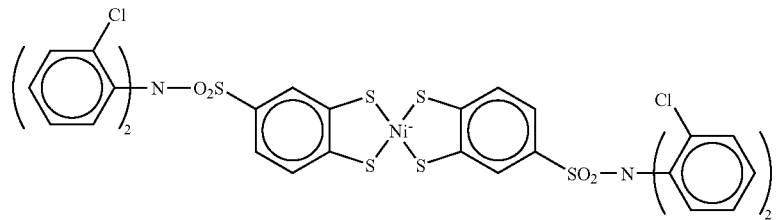
Anion No. 9
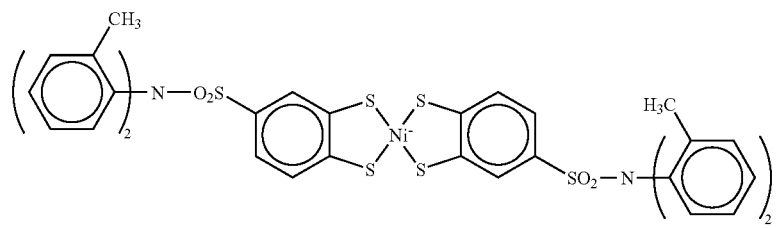
Anion No. 10
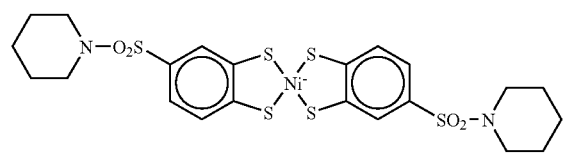
Anion No. 11
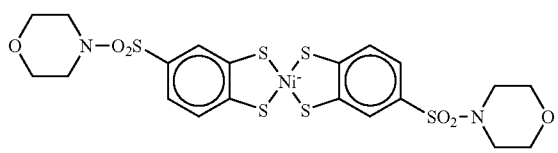
Anion No. 12
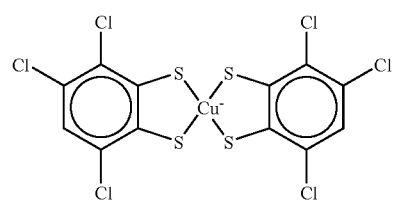
Anion No. 13
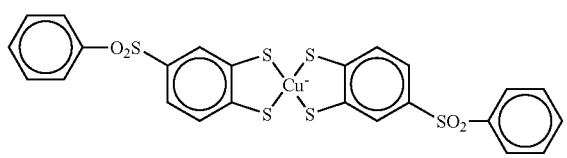
Anion No. 14
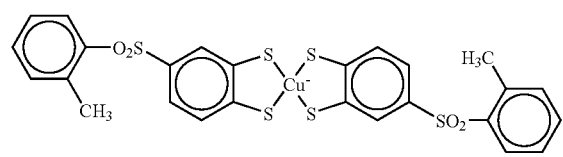
Anion No. 15
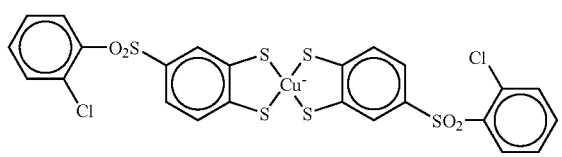
Anion No. 16
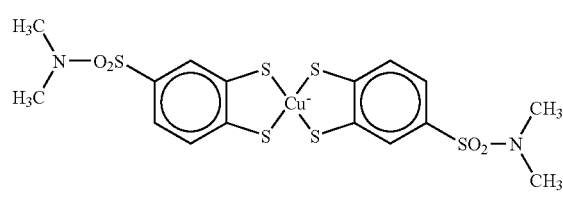
Anion No. 17
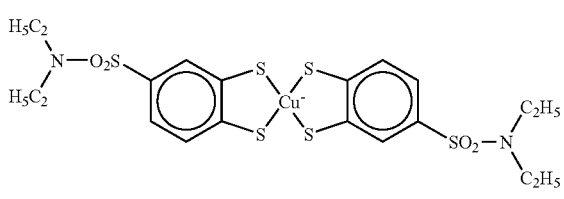
Anion No. 18
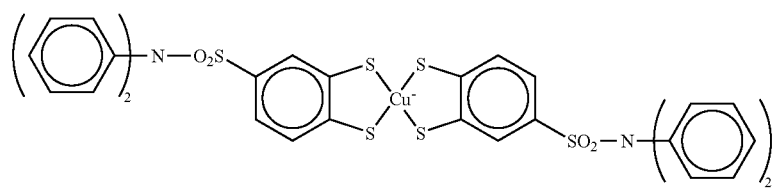

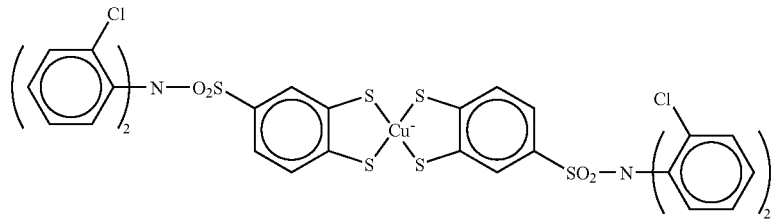

Anion No. 19

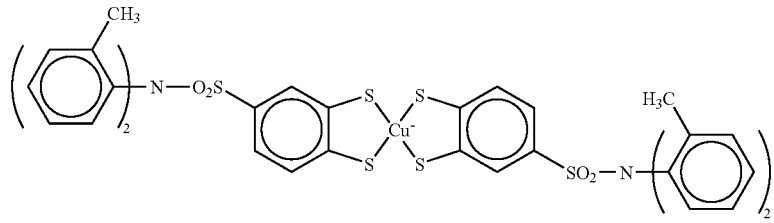

Anion No. 20

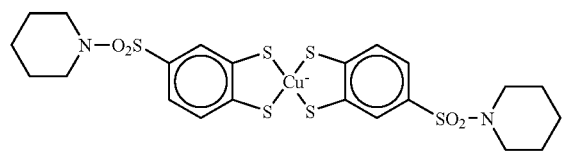

Anion No. 21

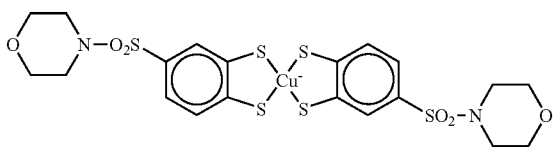

Anion No. 22

In the present invention, the stabilized cyanine dye is a salt of the above cyanine cation and the quencher cation, and can be produced in accordance with a well known method.

For example, it can easily be obtained by salt exchange of a salt compound of a cyanine cation having the corresponding structure with a halogen, an inorganic anion or an organic anion, with a salt compound of a quencher anion having the corresponding structure with a tetraalkyl ammonium cation.

In the composition for an optical film of the present invention, the amount of the stabilized cyanine dye is preferably from 0.01 to 30 mass %, more preferably from 0.1 to 10 mass %, based on the total solid content contained in the composition.

Quencher Compound

In the present invention, the quencher compound is a compound having a function to de-excite an active molecule in an excited state, like the above-mentioned quencher anion.

In the present invention, the quencher compound to be used in combination with the above stabilized cyanine dye, is not particularly limited, and an optional compound which is commonly used as a quencher compound in an optical film such as a near infrared absorbing film, may be employed. As such a quencher compound, a diimonium dye, an aluminum dye, a dithiol metal complex dye such as a dithiol nickel complex (e.g. see JP-A-2001-288380) or a dithiol copper complex (e.g. see WO98/34988), a hindered amine dye or a nitroso compound of a diphenylamine (e.g. see JP-A-2000-168233) may, for example, be mentioned. These quencher compounds may be used alone or in combination as a mixture of two or more different types.

Near Infrared Absorptive Quencher Compound

In the present invention, among the above-mentioned quencher compounds, a near infrared absorptive quencher compound such as a diimonium dye, an aminium dye or a dithiol nickel complex, is preferably employed. By incorporating such a near infrared absorptive quencher compound, a still higher near infrared absorptivity can be obtained.

In the present invention, "the near infrared absorptive quencher compound" means a compound which is the above-described quencher compound and which has near infrared absorptivity.

Here, "has near infrared absorptivity" means to have an absorption peak within a wavelength range of from 800 to 1,100 nm when the absorption spectrum of the quencher compound is measured by the following measuring method and to have a molar absorptivity ($\epsilon_m$) of at least $1.1 \times 10^3$ at that wavelength (at the maximum absorption wavelength ($\lambda_{max}$)).

Method for Measuring the Molar Absorptivity ($\epsilon_m$)

The quencher compound is diluted with chloroform so that the concentration of the sample will be 20 mg/L to obtain a sample solution. The absorption spectrum of this sample solution is measured within a range of from 300 to 1,300 nm by means of a spectrophotometer (whereby the maximum absorption wavelength ($\lambda_{max}$) is read out, and the molar absorptivity ($\epsilon_m$) at the maximum absorption wavelength ($\lambda_{max}$) is calculated from the following formula.

$$\epsilon = -\log(I/I_0)$$

($\epsilon$: absorptivity, $I_0$: light intensity before incidence, I: light intensity after incidence)

$$\epsilon_m = \epsilon/(c \cdot d)$$

($\epsilon_m$: molar absorptivity, c: concentration of the sample (mol/L), d: length of the cell)

These infrared absorptive quencher compounds may be used alone or in combination as a mixture of two or more different types.

As such a near infrared absorptive quencher compound, a diimonium dye is preferably employed, since the visual color of the optical film thereby obtainable will be particularly good.

Further, as mentioned above, it is known that when such a diimonium dye is used in combination with a cyanine dye as disclosed in JP-A-2003-21715, remarkable deterioration will result. However, in the present invention, by the combination of the diimonium dye and the stabilized cyanine dye, not only deterioration of the stabilized cyanine dye but also deterioration of the diimonium dye will be prevented. Accordingly, the obtained optical film not only has a high level of near infrared absorptivity but also is excellent in its durability.

The diimonium dye is a compound represented by the following formula (IV):

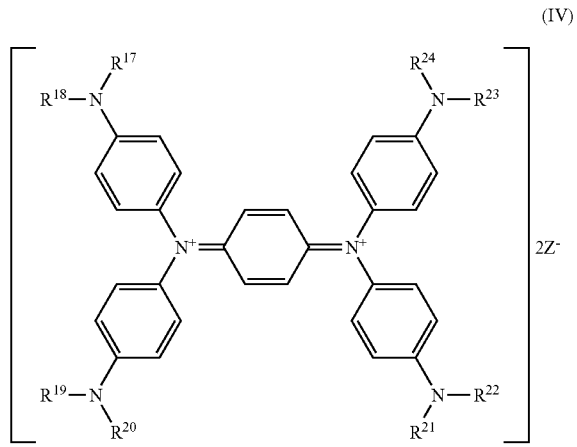

wherein each of $R^{17}$ to $R^{24}$ which are independent of one another, is a hydrogen atom, an alkyl group which may be substituted, an alkenyl group which may be substituted, an aryl group which may be substituted or an alkynyl group which may be substituted, and $Z^-$ is an anion.

In $R^{17}$ to $R^{24}$, the alkyl group may, for example, be a methyl group, an ethyl group, a n-propyl group, an iso-propyl group, a n-butyl group, a sec-butyl group, an iso-butyl group, a tert-butyl group, a n-pentyl group, a tert-pentyl group, a n-hexyl group, a n-octyl group or a tert-octyl group. Such an alkyl group may have a substituent such as an alkoxycarbonyl group, a hydroxyl group, a sulfo group or a carboxyl group.

The alkenyl group may, for example, be a vinyl group, a propenyl group, a butenyl group, a pentenyl group, a hexenyl group, a heptenyl group or an octenyl group. Such an alkenyl group may have a substituent such as a hydroxyl group or a carboxyl group.

The aryl group may, for example, be a benzyl group, a p-chlorobenzyl group, a p-methylbenzyl group, a 2-phenylmethyl group, a 2-phenylpropyl group, a 3-phenylpropyl group, an α-naphthylmethyl group or a β-naphthylethyl group. Such an aryl group may have a substituent such as a hydroxyl group or a carboxyl group.

The alkynyl group may, for example, be a propynyl group, a butynyl group, a 2-chlorobutynyl group, a pentynyl group or a hexynyl group. Such an alkynyl group may have a substituent such as a hydroxyl group or a carboxyl group.

Among them, a $C_{4-6}$ linear or branched alkyl group is preferred. When the carbon number is at least 4, the solubility in an organic solvent will be good, and when the carbon number is at most 6, the heat resistance will be improved. The reason for such improvement of the heat resistance is considered to be an increase of the melting point of the diimonium dye (I).

$Z^-$ represents an anion, such as a chlorine ion, a bromine ion, an iodine ion, a perchloric ion, a periodic ion, a nitric ion, a benzenesulfonic ion, a p-toluenesulfonic ion, a methylsulfuric ion, an ethylsulfuric ion, a propylsulfuric ion, a tetrafluoroboric ion, a tetraphenylboric ion, a hexafluorophosphoric ion, a benzenesulfinic ion, an acetic ion, a trifluoroacetic ion, a propionacetic ion, a benzoic ion, an oxalic ion, a succinic ion, a malonic ion, an oleic ion, a stearic ion, a citric ion, a monohydrogen diphosphoric ion, a dihydrogen monophosphoric ion, a pentachlorostanic ion, a chlorosulfonic ion, a fluorosulfonic ion, a trifluoromethane sulfonic ion, a hexafluoroantimonic ion, a molybdenic ion, a tungstic ion, a titanic ion or a zirconic ion, or an anion of $(R_fSO_2)_2N^-$ or $(R_fSO_2)_3C^-$.

Here, $R_f$ is a $C_{1-4}$ fluoroalkyl group, preferably a $C_{1-2}$ fluoroalkyl group, most preferably a $C_1$ fluoroalkyl group. If the carbon number is within the above range, such is preferred in that the durability such as heat resistance or moisture resistance, and the solubility in the after-mentioned organic solvent, will be good. As such $R_f$, a perfluoroalkyl group such as —$CF_3$, —$C_2F_5$, —$C_3F_7$ or —$C_4F_9$, —$C_2F_4H$, —$C_3F_6H$ or —$C_2F_8H$ may, for example, be mentioned.

The above fluoroalkyl group is particularly preferably a perfluoroalkyl group, whereby the moisture resistance will be excellent. Further, it is most preferably a trifluoromethyl group.

Among these anions, a perchloric ion, an iodine ion, a tetrafluoroboric ion, a hexafluorophosphoric ion, a hexafluoroantimonic ion or a trifluoromethane sulfonic ion is preferred. A hexafluoroantimonic ion is particularly preferred, since it is most excellent in the thermal stability, and $(R_fSO_2)_2N^-$ or $(R_fSO_2)_3C^-$ is preferred, since it is excellent also in the moisture resistance.

In the first aspect of the present invention, the diimonium dye is preferably one wherein the molar absorptivity $\epsilon_m$ in the vicinity of 1,000 nm is from about $0.8 \times 10^4$ to $1.0 \times 10^6$, as measured by the above-mentioned measuring method.

Further, in order to suppress deterioration of the optical film during processing or to impart practical durability after forming into an optical film, it is preferred to use a diimonium dye having a purity of at least 98% or a diimonium dye having a melting point of at least 210° C. It is particularly preferred to use a diimonium dye having a purity of at least 98% and a melting point of at least 210° C.

The amount of the quencher compound in the composition for an optical film according to the first aspect of the present invention, is preferably from 10 to 5,000 parts by mass, more preferably from 50 to 2,000 parts by mass, further preferably from 100 to 1,500 parts by mass, per 100 parts by mass of the stabilized cyanine compound. When the amount is at least 10 parts by mass, the effect for improving the durability such as light resistance or heat resistance will be sufficient, and when it is not higher than 5,000 parts by mass, the near infrared absorbing layer formed by using the composition will not be colored, whereby an optical film having good appearance can be obtained.

In a case where the quencher compound contains the near infrared absorptive quencher compound, the proportion of the near infrared absorptive quencher compound in the total quencher compound is preferably from 30 to 100 mass %, more preferably from 50 to 100 mass %, further preferably from 80 to 100 mass %. When the proportion of the near infrared absorptive quencher compound is at least 30 mass %, a sufficient near infrared absorptivity can be obtained.

In the first aspect of the present invention, as mentioned above, it is particularly preferred to incorporate a diimonium dye as the near infrared absorptive quencher compound, and its amount is preferably from 50 to 300 parts by mass, more preferably from 100 to 2,000 parts by mass, further preferably from 50 to 1,500 parts by mass, per 100 parts by mass of the stabilized cyanine compound.

When the amount is at least 50 parts by mass, the effects for improving the durability such as light resistance or heat resistance, will be sufficient, and at the same time, adequate near infrared absorptivity will be obtained, and when it is not higher than 3,000 parts by mass, the interaction with the stabilized cyanine dye will be suppressed, whereby the stability of the dye will be good.

Other Optional Components

Further, at least one near infrared absorbing dye having a maximum absorption wavelength within a range of from 800 to 1,100 nm may further be incorporated to the composition for an optical film of the present invention within a range not to impair the effects of the present invention, in addition to the above-described stabilized cyanine dye and the near infrared absorptive quencher compound.

As such a near infrared absorbing dye, a common one such as an inorganic pigment, an organic pigment or an organic dye, may be used.

As the inorganic pigment, a cobalt pigment, an iron pigment, a chromium pigment, a titanium pigment, a vanadium pigment, a zirconium pigment, a molybdenum pigment, a ruthenium pigment, a platinum pigment, an ITO pigment or an ATO pigment, may, for example, be mentioned.

As the organic pigment or the organic dye, a cyanine dye other than the stabilized cyanine dye, a merocyanine dye, a chloconium dye, squalium dye, an azulenium dye, a polymethine dye, a naphthoquinone dye, a pyririum dye, a phthalocyanine dye, a naphthalocyanine dye, a naphtholactam dye, an azo dye, a condensed azo dye, an indigo dye, a perinone dye, a perylene dye, a dioxazine dye, a quinacridone dye, an isoindolinone dye, a quinophthalone dye, a pyrrol dye, an anthraquinone dye, a thioindigo dye, a metal complex dye, an indolphenol dye or a triallylmethane dye, may, for example, be mentioned.

Among them, a metal complex dye, a phthalocyanine dye, a naphthalocyanine dye, a pyrrol dye or an anthraquinone dye, may, for example, be preferred.

Further, in a case where a diimonium dye is incorporated as the quencher compound, and a salt compound or a metal complex salt containing an anion is incorporated as a near infrared absorbing dye or a color tone correcting dye, it is particularly preferred that the salt compound or the metal complex salt has the same anion as the anion in the above diimonium dye. With the same anion, even when a salt exchange reaction with the anion of the diimonium dye takes place, the diimonium dye will not change, and the absorptivity, the thermal stability, etc. will not change.

Further, the composition for an optical film according to the first aspect of the present invention may further contain a color tone correcting dye having a maximum absorption wavelength within a range of from 300 to 800 nm, a leveling agent, an antistatic agent, a thermal stabilizer, an antioxidant, a dispersing agent, a flame retardant, a lubricating agent, a plasticizer or an ultraviolet absorber.

Optical Film

The optical film according to the second aspect of the present invention is an optical film having a near infrared absorbing layer which comprises a transparent resin and the above-described composition for an optical film dispersed in the transparent resin. Further, the optical film according to the third aspect of the present invention is characterized in that it has a near infrared absorbing layer which comprises a transparent resin and a diimonium dye of the above formula (V) (hereinafter sometimes referred to as the diimonium dye (V)) contained in the transparent resin.

In the formula (V), $R^{17}$ to $R^{24}$ are as described above. Further, $X^-$ is an anion represented by $(R_fSO_2)_2N^-$ or $(R_fSO_2)_3C^-$. From efficiency in the synthesis, $X^-$ is preferably $(R_fSO_2)_2N^-$. Here, $R_f$ is a $C_{1-4}$ fluoroalkyl group, preferably a $C_{1-2}$ fluoroalkyl group, most preferably a $C_1$ fluoroalkyl group. When the carbon number is within the above range, the durability such as heat resistance or moisture resistance, and the solubility in the following organic solvent will be good, such being preferred. Such $R_f$ may, for example, be a perfluoroalkyl group such as $—CF_3$, $—C_2F_5$, $—C_3F_7$ or $—C_4F_9$, or $—C_2F_4H$, $—C_3F_6H$ or $—C_2F_8H$.

It is particularly preferred that the above fluoroalkyl group is a perfluoroalkyl group, since it is most excellent in moisture resistance. Further, it is most preferably a trifluoromethyl group.

The reason for improvement of the moisture resistance by using the diimonium dye (V) having the anion ($X^-$), as an anion, is not clearly understood. Heretofore, as an anion for the diimonium dye, an inorganic anion such as $SbF_6^-$, $PF_6^-$, $BF_4^-$ or $ClO_4^-$, has been mainly used. However, such an inorganic anion is susceptible to an influence of water, whereby the stability of the diimonium dye is poor. Whereas, it is considered that the anion ($X^-$) to be used in the present invention has a high electron attracting property of the $R_fSO_2$ group, whereby the diimonium dye (V) may be present stably.

With the diimonium dye (V), it is particularly preferred that the molar absorptivity ($\epsilon_m$) in the vicinity of 1,000 nm is from about $0.8 \times 10^4$ to $1.0 \times 10^6$, as measured by the above-mentioned measuring method.

Further, in order to suppress deterioration of the optical film during processing and to impart practical durability after being formed into an optical film, it is preferred to use a diimonium dye (V) having a purity of at lest 98% or a diimonium dye (V) having a melting point of at least 210° C. It is particularly preferred to use a diimonium dye (V) having a purity of at least 98% and a melting point of at least 210° C.

In the optical film according to the third aspect of the present invention, in addition to the diimonium dye (V), at least one member of other optional components may be incorporated. Such other optional components are as described above.

Particularly, it is preferred to incorporate a dye having the maximum absorption wavelength ($\lambda_{max}$) in the vicinity of 850 nm, whereby a wide range of near infrared rays can efficiently be absorbed, as the maximum absorption wavelength ($\lambda_{max}$) of the diimonium dye (V) is present in the vicinity of 1,000 nm, and the total amount of dyes (the total amount of the diimonium dye (V) and other near infrared absorbing dyes) can be reduced. Accordingly, there will be merits such that the cost can be reduced, deterioration of the dyes tends to scarcely take place, and at the time of forming the near infrared absorbing layer, the dyes can sufficiently be dissolved in the organic solvent.

Further, in a case where a salt compound or a metal complex salt containing an anion, is to be incorporated as the near infrared absorbing dye other than the diimonium dye (V), such a salt compound or a metal complex salt preferably has the same anion as the anion ($X^-$) in the diimonium dye (V). In the case of the same anion, even if a salt exchange reaction takes place with the anion of the diimonium dye, the diimonium dye (V) will not be changed, and the moisture resistance, the heat resistance, the near infrared absorptivity, etc. will not be changed.

In the second and third aspects of the present invention, the transparent resin preferably has a glass transition point within a range of from 90 to 180° C., particularly preferably within a range of from 120 to 180° C., whereby the practical durability can be maintained, the molding will be easy, or deterioration of the dye during the molding will be suppressed.

As a preferred transparent resin, a thermoplastic resin such as a polyester resin, a polyolefin resin, a polycycloolefin resin, a polycarbonate resin or a polyacrylic resin, may be mentioned. As such a resin, a commercial product, for example, a polyester resin such as "O-PET", tradename, manufactured by Kanebo, Ltd., a polyolefin resin such as "ARTON", tradename, manufactured by JSR, a polycycloolefin resin such as "Zeonex", tradename, manufactured by Zeon Corporation, a polycarbonate resin such as "IUPILON", tradename, Mitsubishi Engineering-Plastics Corporation, or a polyacrylic resin such as "Halshybrid IR-G204", tradename, manufactured by Nippon Shokubai Co., Ltd., may be employed.

The near infrared absorbing layer may be formed, for example, by dissolving the above-mentioned composition for an optical film or the diimonium dye (V), and the optional components and the transparent resin, in an organic solvent, and applying the obtained coating solution on a substrate, followed by drying.

The amount of the composition for an optical film or the diimonium dye (V) in the near infrared absorbing layer, is preferably from 3 to 20 mass %, based on the transparent resin. When it is at least 3 mass %, a sufficient near infrared absorptivity can be imparted to the optical film, and when it is at most 20 mass %, a sufficient visible light transmittance can be maintained. From such viewpoints, it is particularly preferably from 5 to 10 mass %.

As the organic solvent to dissolve the composition for an optical film or the diimonium dye (V), and the transparent resin, it is possible to employ an alcohol such as methanol, ethanol, isopropyl alcohol, diacetone alcohol, ethyl cellosolve or methyl cellosolve, a ketone such as acetone, methyl ethyl ketone, cyclopentanone or cyclohexanone, an amide such as N,N-dimethylformamide or N,N-dimethylacetamide, a sulfoxide such as dimethyl sulfoxide, an ether such as tetrahydrofuran, dioxane or ethylene glycol monomethyl ether, an ester such as methyl acetate, ethyl acetate or butyl acetate, an aliphatic halogenated hydrocarbon such as chloroform, methylene chloride, dichloroethylene, carbon tetrachloride or trichloroethylene, an aromatic hydrocarbon such as benzene, toluene, xylene, monochlorobenzene or dichlorobenzene, an aliphatic hydrocarbon such as n-hexane or cyclohexanoligroin, or a fluorine-type solvent such as tetrafluoropropyl alcohol or pentafluoropropyl alcohol. Application of the coating solution can be carried out by a coating method such as a dip coating method, a spray coating method, a spinner coating method, a bead coating method, a wire bar coating method, a blade coating method, a roller coating method, a curtain coating method, a slit die coater method, a gravure coater method, a slit reverse coater method, a microgravure method or a comma coater method.

The thickness of the near infrared absorbing layer is preferably within a range of from 0.3 to 50.0 µm. When it is at least 0.3 µm, the near infrared absorptivity can sufficiently be provided, and when it is at most 50 µm, the residue of the organic solvent during the molding can be reduced. From such viewpoints, it is particularly preferably within a range of from 0.5 to 20.0 µm.

Usually, the optical film as in the second or third aspect of the present invention, is disposed on a viewing side of PDP or the like and is accordingly desired to have an achromatic color. Accordingly, the optical film of the present invention is preferably adjusted to satisfy (x, y)= (0.310±0.100, 0.316±0.100) by suitably selecting the type and the content of the dye, since the chromaticity coordinates corresponding to the achromatic color, based on illuminant C, are (x, y)=(0.310, 0.316) as calculated in accordance with JIS Z8701-1999.

Further, the visual average transmittance is preferably adjusted to be at least 45%.

It is particularly preferred to simultaneously satisfy the above definition of the chromaticity coordinates (x, y) and the above definition of the visual average transmittance.

Further, the optical film according to the second or third aspect of the present invention may have at least one optional functional layer other than the near infrared absorbing layer. As such a functional layer, an ultraviolet absorbing layer to prevent deterioration of the dye due to ultraviolet rays and to improve the light resistance, an antireflection layer to improve the visibility of an image, an electromagnetic wave-shielding layer to shield electromagnetic waves emitted from a display device such as PDP, a hard coat layer to provide a scratch resistance function, a layer having a self-healing property, an anti-fouling layer to prevent fouling of the outer surface or an adhesive or bonding layer to bond the respective layers, may, for example, be mentioned.

The optical film of the second or third aspect of the present invention may be a near infrared absorbing layer itself which is formed on a substrate having a releasing property and then peeled, or may be one formed integrally with a transparent support film (hereinafter referred to as the support film) by forming the near infrared absorbing layer on the support film.

The substrate having a releasing property may be in the form of a film or plate, and there is no particular limitation to the material. In order to improve the releasing property, releasing treatment may preferably be applied to the surface of the substrate by means of e.g. a silicone or a resin having a low surface tension.

The material for the support film may be optionally selected for use among materials including a polyester such as polyethylene terephthalate (PET) or polybutylene terephthalate (PBT), a polyolefin such as polyethylene or polypropylene, a polyacrylate, a polymethacrylate such as polymethyl methacrylate (PMMA), a polycarbonate (PC), a polystyrene, a triacetate, a polyvinyl alcohol, a polymethyl chloride, a polyvinylidene chloride, an ethylene/vinyl acetate copolymer, a polyvinyl butyral, a polyurethane and cellophane. Preferred may, for example, be PET, PC or PMMA.

The thickness of the support film is preferably within a range of from 10 to 500 µm, whereby the operation efficiency is good, and the haze value can be controlled to be low. Further, it is preferred to apply corona treatment or adhesion-facilitating treatment to the surface of the support film prior to forming the optical film on the support film.

The optical film of the second or third aspect of the present invention can easily be bonded to a transparent substrate having a high rigidity (hereinafter referred to as the transparent substrate) by providing an adhesive layer, whether it is one peeled from a substrate having a releasing property or one integrally formed with the support film.

The material for the transparent substrate can be optionally selected for use among glass and transparent polymer materials having high rigidity. Preferred may, for example, be glass, tempered or semi-tempered glass, polycarbonate or polyacrylate. When one having the optical film bonded on a transparent substrate, is used as the optical filter, it is capable of providing a function also as a protective plate for a display device such as PDP.

As the adhesive for the adhesive layer, a commercially available adhesive may be used. As preferred specific examples, adhesives such as an acrylate copolymer, a polyvinyl chloride, an epoxy resin, a polyurethane, a vinyl acetate copolymer, a styrene/acryl copolymer, a polyester, a polyamide, a polyolefin, a styrene/butadiene copolymer rubber, a butyl rubber and a silicone resin, may, for example, be mentioned. Further, when the adhesive layer is to be laminated, it is preferred to bond a release film such as PET coated with silicone, on its adhesive surface, from the viewpoint of the operation efficiency.

When an adhesive is to be employed, an additive having various functions, such as an ultraviolet absorber, may be added to such an adhesive.

The optical film of the second or third embodiment of the present invention, or one having such an optical film bonded on a transparent substrate, can be used as an optical filter for a display device such as a cathode ray tube display device or a flat display device such as PDP, a plasma address liquid crystal (PALC) display panel or a field emission display (FED) panel.

The optical film of the second or third embodiment of the present invention has a high level of near infrared absorptivity and is excellent in durability such as light resistance or thermal resistance and thus can suitably be used for an optical filter of e.g. PDP where near infrared rays will be emitted.

Now, the present invention will be described in further detail with reference to Examples. The present invention is by no means restricted by such Examples. Examples 1 to 8 and 12-17 are Examples of the present invention, and Examples 9-11 and 18-22 are Comparative Examples.

Further, $\lambda_{max}$ and $\epsilon_m$ of the near infrared absorptive dye used in the following Examples 1 to 11 (a stabilized cyanine dye and a near infrared absorptive quencher compound) were measured by the following procedure.

The near infrared absorptive dye was diluted with chloroform so that the sample concentration would be 20 mg/L, to obtain a sample solution. The absorption spectrum of this sample solution was measured within a range of 300 to 1,300 nm by means of UV-3100, manufactured by Shimadzu Corporation, whereby the maximum absorption wavelength ($\lambda_{max}$) was read out, and the molar absorptivity ($\epsilon_m$) at the maximum absorption wavelength ($\lambda_{max}$) was calculated by the following formula.

$\epsilon = -\log(I/I_0)$ ($\epsilon$: absorptivity, $I_0$: light intensity before incidence, I: light intensity after incidence)

$\epsilon_m = \epsilon/(c \cdot d)$ ($\epsilon_m$: absorptivity, c: sample concentration (mol/L), d: cell length)

EXAMPLE 1

A transparent polyester resin having a glass transition temperature of 140° C. ("O-PET", tradename, manufactured by Kanebo, Ltd.) was dissolved in a solvent mixture of cyclopentanone/toluene (6/4 volume ratio) at a concentration of 15 mass % to obtain a base resin solution. Based on the resin content of this base resin solution, 6.4 mass % of a diimonium dye (N,N,N',N'-tetrakis(p-dibutylaminophenyl)-p-phenylenediamine-hexafluoroantimonic acid imonium salt): "IRG-022", tradename, manufactured by Nippon Kayaku Co., Ltd., $\lambda_{max}$: 1090 nm, $\epsilon_m$: $1.1 \times 10^5$), and 0.5 mass % of a stabilized cyanine dye ($\lambda_{max}$: 855 nm, $\epsilon_m$: $2.0 \times 10^5$) comprising a cyanine cation of cation No. 11 and a quencher anion of anion No. 22, were added to the base resin solution, to obtain a coating solution having them dissolved. This coating solution was coated on a polyethylene terephthalate film ("A4100", tradename, manufactured by Toyobo Co., Ltd.) having a thickness of 100 μm by a microgravure so that the thickness of the dried coating film would be 4 μm, followed by drying at 120° C. for 5 minutes, to obtain an optical film.

EXAMPLE 2

An optical film was obtained in the same manner as in Example 1, except that the stabilized cyanine dye used in Example 1 was changed to a stabilized cyanine dye ($\lambda_{max}$: 818 nm, $\epsilon_m$: $2.5 \times 10^5$) comprising a cyanine cation of cation No. 13 and a quencher anion of anion No. 22.

EXAMPLE 3

An optical film was obtained in the same manner as in Example 1, except that to the coating solution used in Example 1, 0.5 mass % of the stabilized cyanine dye used in Example 2 was further added.

EXAMPLE 4

An optical film was obtained in the same manner as in Example 3, except that the diimonium dye used in Example 3 was changed to N,N,N',N'-tetrakis(p-dibutylaminophenyl)-p-phenylenediamine.-bis(bis(trifluoromethane sulfonyl)imidic acid)imonium salt ("CIR-1085", tradename, manufactured by Japan Carlit Co., Ltd., $\lambda_{max}$: 1073 nm, $\epsilon_m$: $1.0 \times 10^5$)

EXAMPLE 5

An optical film was obtained in the same manner as in Example 3, except that the base resin solution used in Example 3 was changed to an acrylic resin coating material ("Halshybrid IR-G204", tradename, manufactured by Nippon Shokubai Co., Ltd.; glass transition temperature of the resin=89° C.) having the concentration adjusted to 15 mass % by MEK.

EXAMPLE 6

An optical film was obtained in the same manner as in Example 4, except that the base resin solution used in Example 4 was changed to the base resin solution of Example 5.

EXAMPLE 7

An acrylic resin coating material ("Halshybrid IR-G204", tradename, manufactured by Nippon Shokubai Co., Ltd.; glass transition temperature of the resin=89° C.) was dissolved in MEK at a concentration of 15 mass % to obtain a base resin solution. Based on the resin content of this base resin solution, 9.0 mass % of a diimonium dye (N,N,N',N'-tetrakis(p-dibutylaminophenyl)-p-phenylenediamine-hexafluoroantimonic acid imonium salt): "IRG-022", tradename, manufactured by Nippon Kayaku Co., Ltd.), 1.0 mass % of a stabilized cyanine dye ("SD-AG01", tradename, manufactured by Sumitomo Seika Chemicals Company, Limited, $\lambda_{max}$: 877 nm, $\epsilon_m$: 3.1×10$^5$) and 1.0 mass % of a hexafluoroantimonic acid.cyanine dye (CY-40MCS", tradename, manufactured by Nippon Kayaku Co., Ltd., $\lambda_{max}$: 830 nm, $\epsilon_m$: 2.7×10$^5$), were added to the base resin solution, to obtain a coating solution having them dissolved. This coating solution was coated on a polyethylene terephthalate film ("A4100", tradename, manufactured by Toyobo Co., Ltd.) having a thickness of 100 μm by a microgravure so that the thickness of the dried coating film would be 4 μm, followed by drying at 120° C. for 5 minutes, to obtain an optical film.

EXAMPLE 8

An optical film was obtained in the same manner as in Example 7, except that the diimonium dye used in Example 7 was changed to N,N,N',N'-tetrakis(p-dibutylaminophenyl)-p-phenylenediamine.-bis(bis(trifluoromethane sulfonyl)imidic acid)imonium salt ("CIR-1085", tradename, manufactured by Japan Carlit Co., Ltd., $\lambda_{max}$: 1073 nm, $\epsilon_m$: 1.0×10$^5$), and that the hexafluoroantimonic acid.cyanine dye was changed to a trifluoromethanesulfonylimidic acid.cyanine dye ("CY-40MCFI", tradename, manufactured by Nippon Kayaku Co., Ltd., $\lambda_{max}$: 830 nm, $\epsilon_m$: 2.7×10$^5$).

EXAMPLE 9

An optical film was obtained in the same manner as in Example 1, except that the stabilized cyanine dye used in Example 1 was changed to a non-stabilized cyanine dye ("TW-1926", tradename, manufactured by Asahi Denka Kogyo K.K.).

EXAMPLE 10

An optical film was obtained in the same manner as in Example 9, wherein to the base resin solution used in Example 9, 0.5 mass % of a quencher dye ("EST-5", tradename, manufactured by Sumitomo Seika Chemicals Company, Limited, a tetrabutyl ammonium salt of a quencher anion of anion No. 22, no absorption peak within a range of from 800 to 1,100 nm, $\epsilon_m$<10$^3$) was further added.

EXAMPLE 11

An optical film was obtained in the same manner as in Example 1 except that the diimonium dye used in Example 1 was changed to 6.0 mass % of a phthalocyanine dye ("TX-EX-910", tradename, manufactured by Nippon Shokubai Co., Ltd., $\lambda_{max}$: 978 nm, $\epsilon_m$: 1.0×10$^5$).

TEST EXAMPLE 1

The optical characteristics (the visual average transmittance, the chromaticity, the near infrared transmittance) and the durability (the heat resistance and the light resistance) of the optical films obtained in Examples 1 to 11, were evaluated by the following methods. The results are shown in Table 1.

Optical Characteristics

Using a spectrophotometer (UV-3100, manufactured by Shimadzu Corporation), the spectrum of a test piece of 20×20 mm cut out from each sample was measured within a range of from 380 to 1,300 nm. In accordance with JIS Z8701-1999, the weighted average transmittance (the luminous average transmittance Tv) in the visible region and the chromaticity coordinates (x, y) were calculated.

Further, the transmittances at 850=m, 900=m, 950 nm and 1,000 nm, were measured, and compared with the transmittance of air in the room to obtain the near infrared transmittances. The near infrared transmittances at the respective wavelength were designated as T850, T900, T950 and T1000, respectively.

Heat Resistance

Using a constant temperature apparatus (manufactured by Tokyo Rikakikai Co., Ltd.), the temperature was set at 80° C., and Tv, x and y of each sample after a test for 1,000 hours were measured and compared with the measured values before the test. One having the change as between before and after the test being less than 3% in all of them was evaluated to be ○, one having the change being at least 3% and less than 5% in any one of them, was evaluated to be Δ, and one having the change being at least 5% in any one of them, was evaluated to be X.

Light Resistance

Using a light resistance tester (xenone fade meter X-15F, manufactured by Suga Test Instruments Co., Ltd.), light having a wavelength of 380 nm was applied at 200 MJ/cm$^2$, and Tv, x and y of each sample were measured and compared with the values measured before the test. One having the change as between before and after the test being less than 3% in all of them was evaluated to be ○, one having the change being at least 3% and less than 5% in any one of them, was evaluated to be Δ, and one having the change being at least 5% in any one of them, was evaluated to be X.

TABLE 1

| | Optical characteristics | | | | | | | Durability | |
|---|---|---|---|---|---|---|---|---|---|
| | Luminous average transmittance (%) | Chromaticity | | Near infrared transmittance (%) | | | | Heat resistance | Light resistance |
| | Tv | x | y | T850 | T900 | T950 | T1000 | | |
| Ex. 1 | 74.3 | 0.322 | 0.318 | 5.9 | 1.4 | 0.9 | 0.7 | ○ | ○ |
| Ex. 2 | 76.3 | 0.320 | 0.337 | 6.4 | 4.4 | 1.8 | 1.4 | ○ | ○ |
| Ex. 3 | 79.1 | 0.320 | 0.337 | 5.6 | 6.0 | 6.4 | 5.7 | ○ | ○ |

TABLE 1-continued

|  | Optical characteristics | | | | | | | |
|---|---|---|---|---|---|---|---|---|
|  | Luminous average transmittance (%) | Chromaticity | | Near infrared transmittance (%) | | | | Durability |
|  | Tv | x | y | T850 | T900 | T950 | T1000 | Heat resistance | Light resistance |
| Ex. 4 | 80.0 | 0.320 | 0.336 | 5.3 | 5.8 | 0.3 | 5.0 | ○ | ○ |
| Ex. 5 | 79.3 | 0.320 | 0.336 | 5.7 | 6.1 | 6.5 | 5.7 | ○ | ○ |
| Ex. 6 | 80.5 | 0.320 | 0.336 | 5.6 | 6.0 | 6.3 | 5.3 | ○ | ○ |
| Ex. 7 | 80.2 | 0.318 | 0.336 | 5.7 | 7.1 | 5.6 | 5.2 | ○ | ○ |
| Ex. 8 | 78.2 | 0.318 | 0.337 | 3.5 | 4.9 | 4.0 | 3.5 | ○ | ○ |
| Ex. 9 | 81.0 | 0.320 | 0.316 | 3.7 | 4.3 | 1.8 | 1.4 | ○ | X |
| Ex. 10 | 72.0 | 0.325 | 0.340 | 13.5 | 8.6 | 7.3 | 6.0 | X | X |
| Ex. 11 | 52.9 | 0.318 | 0.322 | 7.3 | 7.4 | 5.8 | 4.6 | ○ | X |

As shown in Table 1, each of the optical films of Examples 1 to 8 (the present invention) was good in the optical characteristics and also good in both the heat resistance and the light resistance.

Whereas, the optical film of Example 9 wherein a cyanine dye was used instead of the stabilized cyanine dye used in Example 1, was poor in the light resistance.

Further, the optical film of Example 10 wherein to the base resin solution employed in Example 9, a near infrared absorptive quencher compound was further incorporated, was poor in both the light resistance and the heat resistance. Further, the values of x and y in the chromaticity coordinates were both high, and the outer appearance was not good. Further, the near infrared transmittance was also high.

Further, the optical film of Example 11 wherein no quencher compound was incorporated, was poor in the light resistance, and the luminous average transmittance was also low.

EXAMPLE 12

A transparent polyester resin having a glass transition temperature of 140° C. ("O-PET", tradename, manufactured by Kanebo, Ltd.,) was dissolved in a solvent mixture of cyclopentanone/toluene (6/4 volume ratio) at a concentration of 15 mass %, to obtain a base resin solution. Based on the resin content of this base resin solution, 14.0 mass % of a diimonium dye (N,N,N',N'-tetrakis(p-dibutylaminophenyl)-p-phenylenediamine.-bis(bis(trifluoromethane sulfonyl)imidic acid)imonium salt; "CIR-1085", tradename, manufactured by Japan Carlit Co., Ltd.) was added to the base resin solution to obtain a coating solution having them dissolved. This coating solution was coated on a polyethylene terephthalate film ("A4100", tradename, manufactured by Toyobo Co., Ltd.) having a thickness of 100 μm by a microgravure so that the thickness of the dried coating film would be 4 μm, followed by drying at 120° C. for 5 minutes, to obtain an optical film having a near infrared absorbing layer on the polyethylene terephthalate film.

EXAMPLE 13

An optical film was obtained in the same manner as in Example 12, except that instead of the diimonium dye used in Example 12, N,N,N',N'-tetrakis(p-dihexylaminophenyl)-p-phenylenediamine-bis(bis(trifluoromethane sulfonyl)imidic acid)imonium salt; "CIR-1105", tradename, manufactured by Japan Carlit Co., Ltd., ($\lambda_{max}$: 1059 nm, $\epsilon_m$: 9.8×10$^4$) was used.

EXAMPLE 14

An optical film was obtained in the same manner as in Example 12, except that 14.0 mass % of the dye used in Example 12, was changed to 6.7 mass %, and further 2.0 mass % of a phthalocyanine dye ("IR-14", tradename, manufactured by Nippon Shokubai Co., Ltd, $\lambda_{max}$: 890 nm) and 1.4 mass % of a phthalocyanine dye ("IR-12", tradename, manufactured by Nippon Shokubai Co., Ltd, $\lambda_{max}$: 833 nm) were added.

EXAMPLE 15

An optical film was obtained in the same manner as in Example 12, except that the base material solution used in Example 12 was changed to a solution of an acrylic resin ("Halshybrid IR-G204", tradename, manufactured by Nippon Shokubai Co., Ltd.; glass transition temperature of the resin=89° C.) adjusted to 15 mass % by means of methyl ethyl ketone (MEK).

EXAMPLE 16

An optical film was obtained in the same manner as in Example 14, except that the base material solution used in Example 14 was changed to a solution of an acrylic resin ("Halshybrid IR-G204", tradename, manufactured by Nippon Shokubai Co., Ltd.) adjusted to 15 mass % by means of MEK.

EXAMPLE 17

An optical film was obtained by changing the polyethylene terephthalate film used in Example 14 to an antireflection film ("ARCTOP URP2199", tradename, manufactured by Asahi Glass Company, Limited), and the near infrared absorbing layer prepared in Example 14, was formed on the side opposite to the antireflection layer.

EXAMPLE 18

An optical film was obtained in the same manner as in Example 12, wherein the dye used in Example 12 was changed to a diimonium dye (N,N,N',N'-tetrakis(p-dibutylaminophenyl)-p-phenylenediamine-perchloric acid imonium salt); "CIR-1080", tradename, manufactured by Japan Carlit Co., Ltd., $\lambda_{max}$: 1070 nm, $\epsilon_m$: $8.8 \times 10^4$).

EXAMPLE 19

An optical film was obtained in the same manner as in Example 12, except that the dye used in Example 12 was changed to a diimonium dye (N,N,N',N'-tetrakis(p-dibutylaminophenyl)-p-phenylenediamine-hexafluoroantimonic acid imonium salt); "IRG-022", tradename, manufactured by Nippon Kayaku Co., Ltd.).

EXAMPLE 20

An optical film was obtained in the same manner as in Example 12, except that the dye used in Example 12 was changed to a diimonium dye (N,N,N',N'-tetrakis(p-dibutylaminophenyl)-p-phenylenediamine-trifluoromethane sulfonic acid imonium salt); "NIR-IMFS", tradename, manufactured by Nagase Chemitecs K.K., $\lambda_{max}$: 1077 nm, $\epsilon_m$: $9.3 \times 10^4$).

EXAMPLE 21

An optical film was obtained in the same manner as in Example 12, except that the dye used in Example 12 was changed to a diimonium dye (N,N,N',N'-tetrakis(p-dibutylaminophenyl)-p-phenylenediamine-p-toluene sulfonic acid imonium salt); "NIR-IMPTS", tradename, manufactured by Nagase Chemitecs K.K., $\lambda_{max}$: 1077 nm, $\epsilon_m$: $8.2 \times 10^4$).

EXAMPLE 22

An optical film was obtained in the same manner as in Example 18, except that the amount of the dye used in Example 18 was changed to 30 mass %.

TEST EXAMPLE 2

The optical characteristics (the luminous average transmittance, the chromaticity, the near infrared transmittance) and the durability (the heat resistance, the moisture resistance) of the optical films obtained in Example 12 to 22, were evaluated. The results are shown in Table 2.

Further, in Table 2, the anion ($X^-$) of the diimonium dye used in Examples 12 to 22, and the carbon number of side chain R (which corresponds to $R^{17}$ to $R^{24}$ in the cation of the formula (V)), are also indicated.

Moisture Resistance

Using a constant temperature and humidity tester (KCH-1000, manufactured by Tokyo Rikakikai Co., Ltd.), the temperature was set at 60° C. and the humidity was set at 95% RH, and Tv, x and y of each sample after the test for 500 hours were measured and compared with the values measured before the test. One having the change as between before and after the test, being less than 3% in all of them, was evaluated to be ○, one having the change being at least 3% and less than 5% in any one of them, was evaluated to be Δ, and one having the change being at least 5% in any one of them, was evaluated to be X.

TABLE 2

| | Optical characteristics | | | | | | | | | Diimonium dye | |
|---|---|---|---|---|---|---|---|---|---|---|---|
| | Luminous transmittance | Chromaticity coordinates | | Near infrared absorptivity (%) | | | | Heat | Moisture | | |
| | Tv | x | y | T850 | T900 | T950 | T1000 | resistance | resistance | $X^-$ | R |
| Ex. 12 | 73.4 | 0.324 | 0.334 | 13.7 | 3.1 | 0.7 | 0.4 | ○ | ○ | $(CF_3SO_2)_2N^-$ | C4 |
| Ex. 13 | 75.1 | 0.324 | 0.336 | 13.5 | 3.0 | 1.0 | 0.5 | ○ | ○ | $(CF_3SO_2)_2N^-$ | C6 |
| Ex. 14 | 70.0 | 0.315 | 0.323 | 11.8 | 9.0 | 6.0 | 5.4 | ○ | ○ | $(CF_3SO_2)_2N^-$ | C4 |
| Ex. 15 | 74.0 | 0.324 | 0.332 | 13.1 | 3.5 | 0.5 | 0.4 | ○ | ○ | $(CF_3SO_2)_2N^-$ | C4 |
| Ex. 16 | 70.5 | 0.314 | 0.322 | 10.2 | 8.5 | 6.0 | 5.2 | ○ | ○ | $(CF_3SO_2)_2N^-$ | C4 |
| Ex. 17 | 73.9 | 0.316 | 0.324 | 12.1 | 9.3 | 6.1 | 5.5 | ○ | ○ | $(CF_3SO_2)_2N^-$ | C4 |
| Ex. 18 | 75.5 | 0.324 | 0.335 | 29.0 | 7.9 | 5.8 | 4.8 | Δ | X | $ClO_4^-$ | C4 |
| Ex. 19 | 72.9 | 0.322 | 0.332 | 13.3 | 3.2 | 1.3 | 0.4 | ○ | X | $SbF_6^-$ | C4 |
| Ex. 20 | 77.3 | 0.321 | 0.331 | 20.5 | 7.4 | 4.4 | 4.8 | X | X | $CF_3SO_4^-$ | C4 |
| Ex. 21 | 91.4 | 0.312 | 0.320 | 89.9 | 89.3 | 89.5 | 89.2 | X | X | $CH_3C_6H_4SO_3^-$ | C4 |
| Ex. 22 | 61.0 | 0.336 | 0.347 | 14.6 | 3.8 | 1.4 | 0.9 | X | X | $ClO_4^-$ | C4 |

As shown in Table 2, each of the optical films of Examples 12 to 17 (the present invention) was good in the optical characteristics and also good in both the heat resistance and the moisture resistance. Among them, the optical film of Example 14 wherein a dye other than the diimonium dye was incorporated, showed excellent optical characteristics despite the total amount of dyes is small.

Whereas, the optical films in Example 20 wherein $CF_3SO_3^-$ was used as an anion and in Example 21 wherein $CH_3C_6H_4SO_3^-$ was used as an anion, were poor in the moisture resistance, and particularly in Examples 20 and 21, the heat resistance was also poor. Further, the optical film of Example 21 was also substantially poor in the near infrared absorptivity. This is considered to be attributable to the fact that the diimonium dye used in Example 21 was very poor in the stability in the near infrared absorbing layer and was rapidly destroyed in the layer.

Further, the optical film of Example 12 wherein the amount of the diimonium dye used in Example 18 was increased, had a low Tv, and the chromaticity coordinates also departed substantially from the ideal values ((x, y)= (0.310, 0.316)). Further, both the heat resistance and the moisture resistance were poor.

The entire disclosures of Japanese Patent Application No. 2003-273677 filed on Jul. 11, 2003 and Japanese Patent Application No. 2003-275442 filed on Jul. 16, 2003 including specifications, claims and summaries are incorporated herein by reference in their entireties.

What is claimed is:

1. A composition for an optical film comprising a stabilized cyanine dye and a quencher compound, wherein the stabilized cyanine dye comprises a cation and a quencher anion, and the cation is selected from the group consisting of compounds of the following formulae (I) to (III):

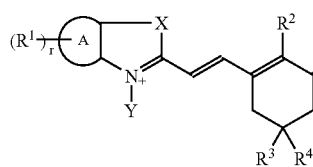
(I)

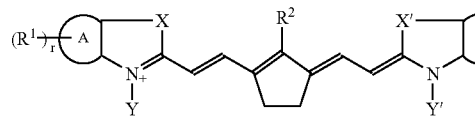
(II)

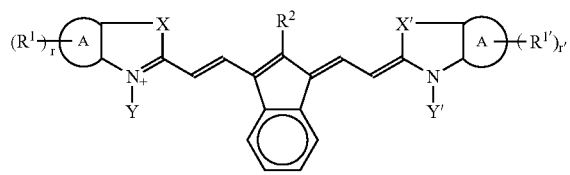
(III)

wherein each of rings A and A' which are independent of each other, is a benzene ring, a naphthalene ring or a pyridine ring, each of $R^1$ and $R^{1'}$ which are independent of each other, is a halogen atom, a nitro group, a cyano group, a $C_{6-30}$ aryl group, a $C_{1-8}$ alkyl group or a $C_{1-8}$ alkoxy group, each of $R^2$, $R^3$ and $R^4$ which are independent of one another, is a hydrogen atom, a halogen atom, a cyano group, a $C_{6-30}$ aryl group, a diphenylamino group or a $C_{1-8}$ alkyl group, each of X and X' which are independent of each other, is an oxygen atom, a sulfur atom, a selenium atom, a propan-2,2-diyl group, a butan-2,2-diyl group, a $C_{3-6}$ cycloalkan-1,1-diyl group, —NH— or —$NY_1$—, each of Y,Y' and $Y_1$ which are independent of one another, is a $C_{1-30}$ organic group, and each of r and r' which are independent of each other, is an integer of from 0 to 2.

2. The composition for an optical film according to claim 1, wherein the quencher compound comprises a near infrared absorptive quencher compound.

3. The composition for an optical film according to claim 2, wherein the near infrared absorptive quencher compound comprises a diimomum dye of the following formula (IV):

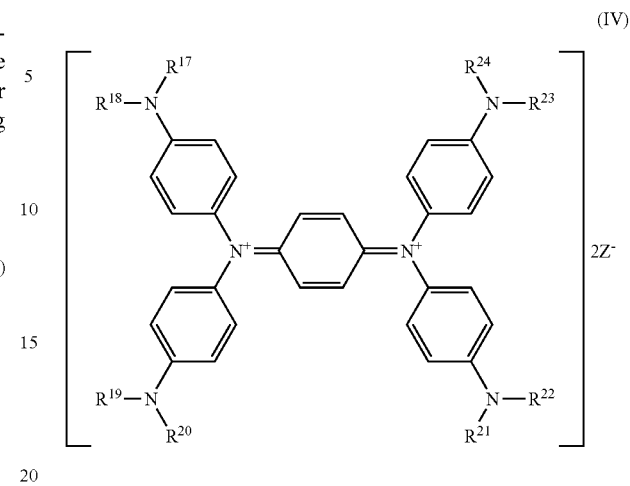
(IV)

wherein each of $R_{17}$ to $R_{24}$ which are independent of one another, is a hydrogen atom, an alkyl group which may be substituted, an alkenyl group which may be substituted, an aryl group which may be substituted or an alkynyl group which may be substituted, and $Z^-$ is an anion.

4. An optical film having a near infrared absorbing layer which comprises a transparent resin and the composition for an optical film as defined in claim 1, dispersed in the transparent resin.

5. An optical film having a near infrared absorbing layer which comprises a transparent resin and the composition for an optical film as defined in claim 2, dispersed in the transparent resin.

6. An optical film having a near infrared absorbing layer which comprises a transparent resin and the composition for an optical film as defined in claim 3, dispersed in the transparent resin.

7. An optical film having a near infrared absorbing layer which comprises a transparent resin and a diimonium dye of the following formula (V) contained in the transparent resin:

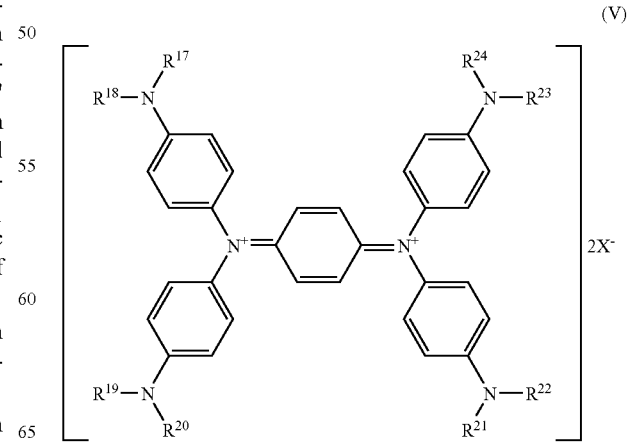
(V)

wherein each of $R^{17}$ to $R^{24}$ which are independent from one another, is a hydrogen atom, an alkyl group which may be substituted, an alkenyl group which may be substituted, an aryl group which may be substituted, or an alkynyl group which may be substituted, $X^-$ is an anion represented by $(R_fSO_2)_2N^-$ or $(R_fSO_2)_3C^-$, and $R_f$ is a $C_{1-4}$ fluoroalkyl group.

8. The optical film according to claim 7, wherein the fluoroalkyl group is a perfluoroalkyl group.

9. The optical film according to claim 7, which further contains a near infrared absorbing dye other than the above diimonium dye, having the maximum absorption wavelength ($\lambda_{max}$) within a range of from 800 to 1,100 nm, in the transparent resin.

10. The optical film according to claim 8, which further contains a near infrared absorbing dye other than the above diimonium dye, having the maximum absorption wavelength ($\lambda_{max}$) within a range of from 800 to 1,100 nm, in the transparent resin.

11. A plasma display device, which comprises:
a plasma display panel having the optical film of claim 1 on the viewing side of the plasma display panel.

12. A plasma display device, which comprises:
a plasma display panel having the optical film of claim 7 on the viewing side of the plasma display panel.

* * * * *